(12) United States Patent
Yaguchi

(10) Patent No.: US 11,153,479 B2
(45) Date of Patent: Oct. 19, 2021

(54) IMAGE PROCESSING APPARATUS, CAPABLE OF DETECTING AN AMOUNT OF MOTION BETWEEN IMAGES BY TRACKING A POINT ACROSS ONE OR MORE IMAGES, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Hiroyuki Yaguchi, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 16/366,107

(22) Filed: Mar. 27, 2019

(65) Prior Publication Data

US 2019/0306417 A1    Oct. 3, 2019

(30) Foreign Application Priority Data

Mar. 28, 2018 (JP) .............................. JP2018-062258

(51) Int. Cl.
    *H04N 5/232*     (2006.01)
    *H04N 5/225*     (2006.01)
    *G06F 9/30*      (2018.01)
    *G06K 9/32*      (2006.01)

(52) U.S. Cl.
    CPC ....... *H04N 5/23229* (2013.01); *G06F 9/3004* (2013.01); *G06K 9/3241* (2013.01); *H04N 5/2253* (2013.01)

(58) Field of Classification Search
    CPC ............ H04N 5/23229; H04N 5/2253; H04N 5/23254; G06K 9/3241; G06F 9/3004; G08B 13/19608; G06T 7/20
    See application file for complete search history.

(56) References Cited

U.S. PATENT DOCUMENTS

2013/0314548 A1* 11/2013 Guan ................... G06K 9/3233
                                                          348/169
2015/0312493 A1* 10/2015 Aldridge .............. H04N 5/2355
                                                          348/157

FOREIGN PATENT DOCUMENTS

| JP | 2007-334625 A | 12/2007 |
| JP | 2008-192060 A | 8/2008 |
| JP | 4504158 B | 7/2010 |
| JP | 2012-073997 A | 4/2012 |

* cited by examiner

*Primary Examiner* — Nicholas G Giles
(74) *Attorney, Agent, or Firm* — Cowan, Liebowitz & Latman, P.C.

(57) ABSTRACT

There is provided an image processing apparatus. A determination unit determines a movement direction of an object. A setting unit sets, within a shooting range, a plurality of processing areas that are arranged in a different direction from the movement direction. A selection unit selects a tracking point in each processing area of a predetermined shot image. A tracking unit tracks, inside each processing area, the tracking point across one or more shot images that are shot after the predetermined shot image.

14 Claims, 20 Drawing Sheets

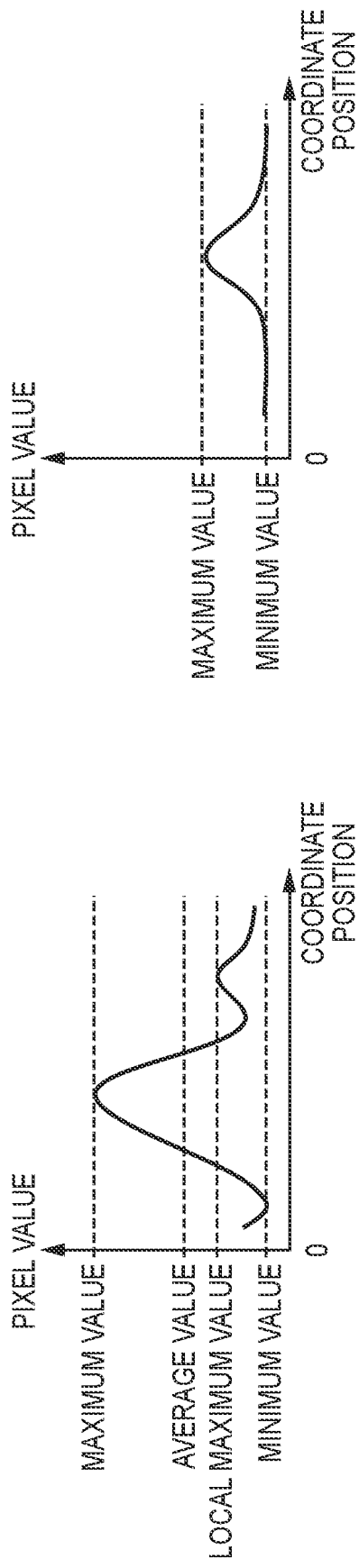
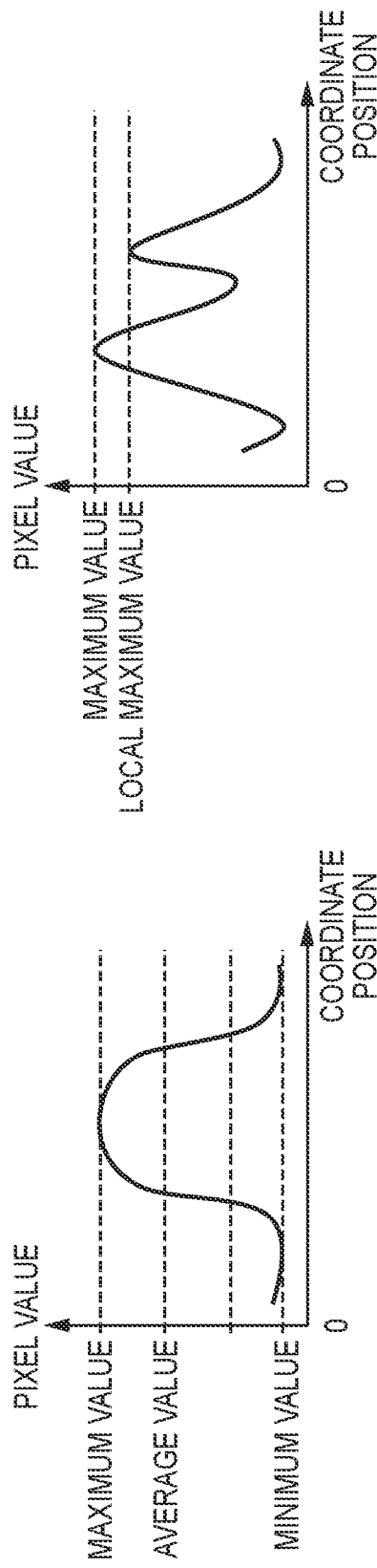

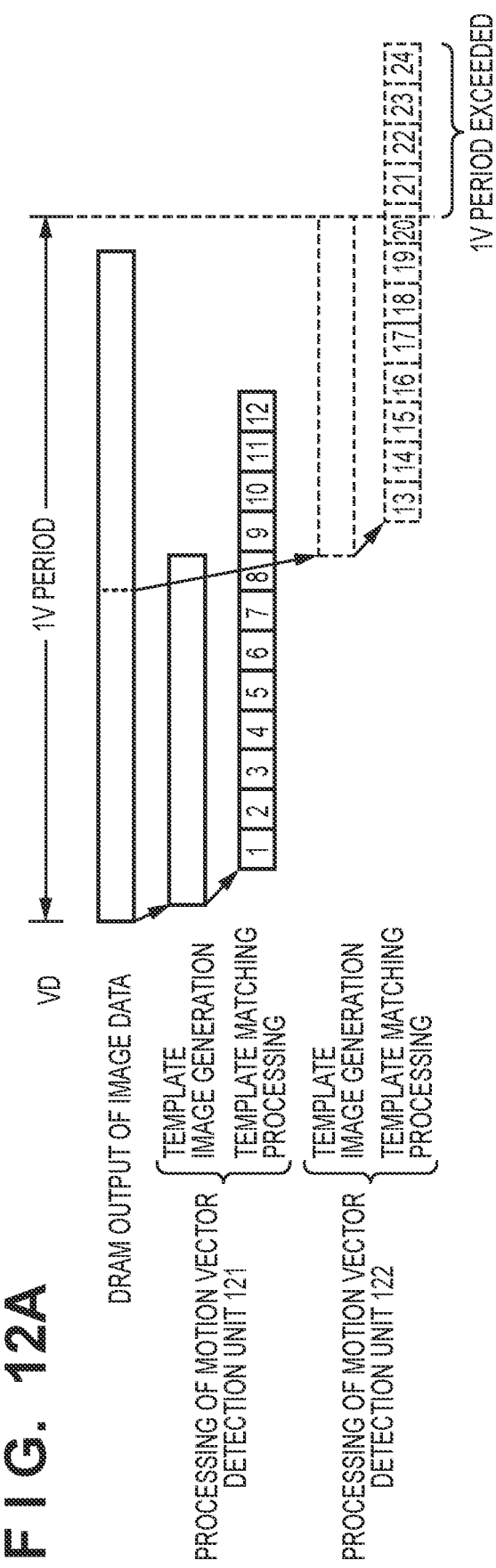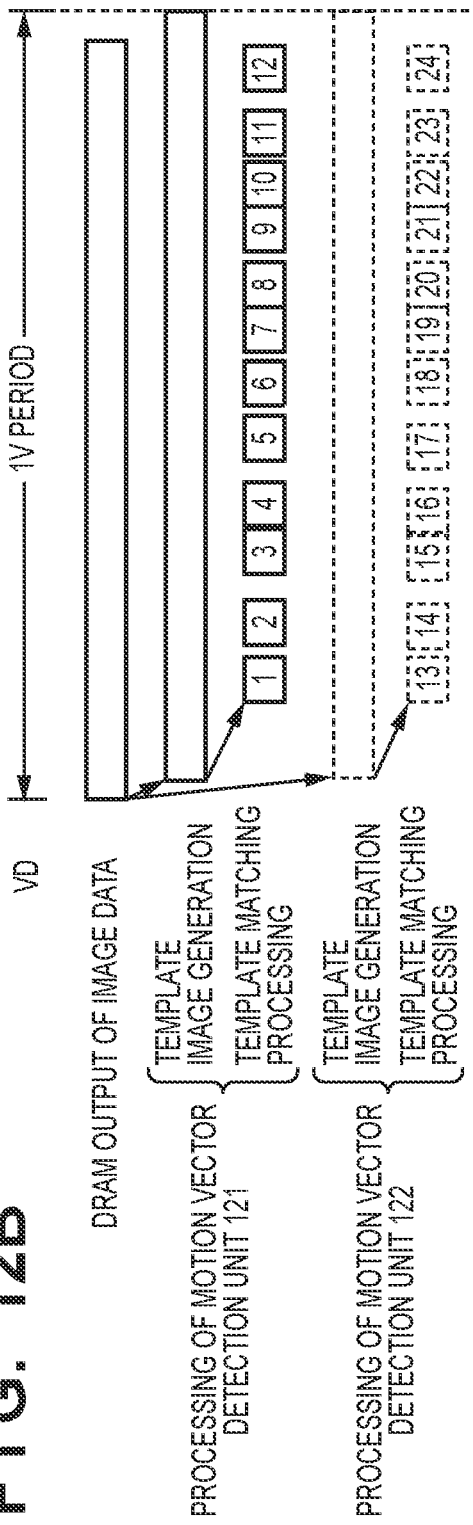

FIG. 20A

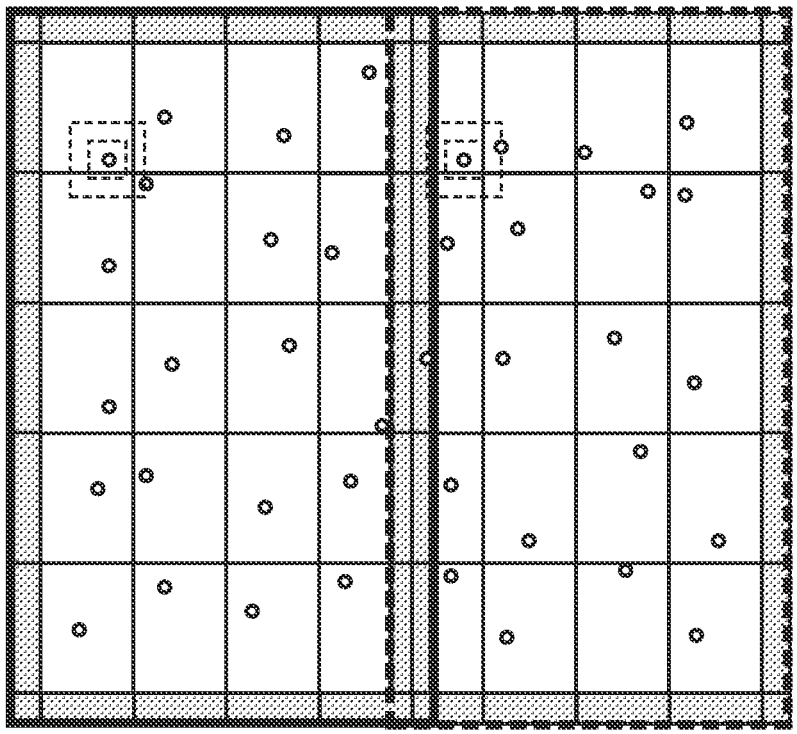

- PROCESSING AREA OF MOTION VECTOR DETECTION UNIT 121
- PROCESSING AREA OF MOTION VECTOR DETECTION UNIT 122
- FEATURE POINT EXTRACTION GRID SQUARE
- PERIPHERAL GRID SQUARE
- ○ FEATURE POINT
- TEMPLATE MATCHING AREA

FIG. 20B

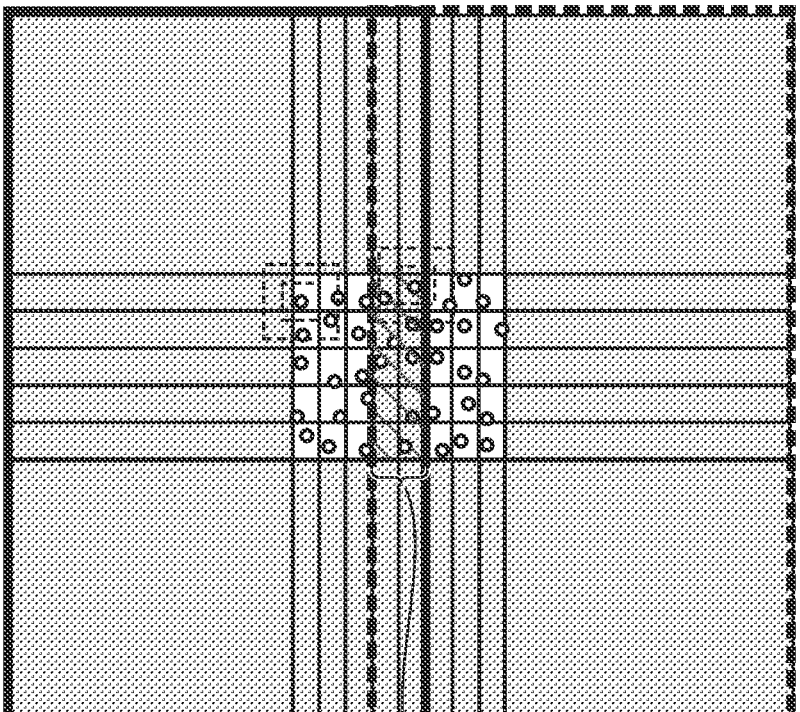

- PROCESSING AREA OF MOTION VECTOR DETECTION UNIT 121
- PROCESSING AREA OF MOTION VECTOR DETECTION UNIT 122
- FEATURE POINT EXTRACTION GRID SQUARE
- PERIPHERAL GRID SQUARE
- ○ FEATURE POINT
- TEMPLATE MATCHING AREA
- SUPPLEMENTATION PRIORITY GRID SQUARE

2000

IMAGE PROCESSING APPARATUS, CAPABLE OF DETECTING AN AMOUNT OF MOTION BETWEEN IMAGES BY TRACKING A POINT ACROSS ONE OR MORE IMAGES, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

In order to perform image stabilization on video shot using an image capturing apparatus such as a digital video camera, it is necessary to detect the amount of motion between frame images and perform position alignment on a plurality of images. As methods of detecting the amount of motion between frame images, there are methods that use information of external devices such as gyro sensors and methods that estimate the amount of motion from shot frame images.

Methods of estimating the amount of motion using frame images have been variously proposed heretofore, with motion vector detection through template matching being one such typical method. In template matching, first one of two frame images included in video is taken as an original image and the other frame image is taken as a reference image. A rectangular area of predetermined size arranged on the original image is then taken as a template block, and the correlation with the distribution of pixel values within the template block is derived at various positions of the reference image. At this time, the position at which the correlation is highest in the reference image is the movement destination of the template block, and the direction and movement amount to the movement destination when based on the position of the template block on the original image will be the motion vector.

In order to improve the detection rate of motion vectors, there is a technology that involves extracting a feature point from a frame image, and performing template matching by arranging the template block on the extracted feature point. Here, when feature point extraction is performed on an entire image, the distribution of the feature points will often be non-uniform. In the case where motion vectors obtained with respect to non-uniform feature points are used in the application of image stabilization, image stabilization will mainly be performed on the area in which the feature is concentrated. In view of this, as disclosed in Japanese Patent Laid-Open No. 2008-192060, in order to distribute feature points uniformly, a technology is known that involves dividing an image into grid squares, calculating a feature value representing the size of the feature for every pixel, and extracting the pixel having the largest feature value within each grid square as a feature point.

Also, as disclosed in Japanese Patent Laid-Open No. 2007-334625, in order to improve the detection rate of motion vectors, a technology for tracking feature points is known. Feature point tracking can be realized by sequentially detecting the motion vector of a feature point extracted from an image over a plurality of consecutive frame images.

FIG. 14 is a diagram showing an outline of feature point tracking processing. The image capturing apparatus extracts a feature point 1401 within a feature point extraction grid square 1404 for performing feature point extraction, and sets a template area 1403. The image capturing apparatus then implements template matching within a template matching area 1406 and calculates a vector value 1407. Peripheral grid squares 1405 that do not undergo feature point extraction but are used in template matching are arranged around the feature point extraction grid squares 1404.

In the processing of the next frame, the image capturing apparatus implements template matching centered at a tracking destination feature point 1402 that is obtained by adding the calculated vector value 1407 to the feature point 1401. Thereafter, the image capturing apparatus repeats, on the tracking destination feature point, the processing for adding the vector value and detecting the next tracking destination feature point, over a plurality of frames.

Also, as disclosed in Japanese Patent No. 4504158 and Japanese Patent Laid-Open No. 2012-73997, technologies for restricting the range of tracking based on the movement direction of the tracking target are also known.

However, the above-described patent documents do not describe the case in which the feature point tracking processing is performed on a plurality of processing areas.

SUMMARY OF THE INVENTION

The present invention has been made in view of such circumstances, and provides a technology that, in the case of tracking feature points inside each of a plurality of processing areas in a shooting range, reduces the possibility of feature points moving in the direction of another processing area and tracking failure (loss of feature points) occurring.

According to a first aspect of the present invention, there is provided an image processing apparatus comprising: a determination unit configured to determine a movement direction of an object; a setting unit configured to set, within a shooting range, a plurality of processing areas that are arranged in a different direction from the movement direction; a selection unit configured to select a tracking point in each processing area of a predetermined shot image; and a tracking unit configured to track, inside each processing area, the tracking point across one or more shot images that are shot after the predetermined shot image.

According to a second aspect of the present invention, there is provided an image processing apparatus comprising: a setting unit configured to set a plurality of processing areas within a shooting range, and to set a plurality of selection areas within each processing area; a selection unit configured to select a tracking point in each selection area of each processing area of a predetermined shot image; and a tracking unit configured to track, inside each processing area, the tracking point across one or more shot images that are shot after the predetermined shot image, wherein, in a case where, in a specific shot image of the one or more shot images, the tracking unit fails in tracking of a specific tracking point selected in a specific processing area of the predetermined shot image, the selection unit selects a new tracking point to be substituted for the specific tracking point in a specific selection area among the plurality of selection areas of the specific processing area of the specific shot image, and the specific selection area is one of one or more selection areas that are next to or at least partially overlap with another processing area.

According to a third aspect of the present invention, there is provided an image capturing apparatus comprising: the image processing apparatus according to the first aspect; and an image capturing unit configured to generate the predetermined shot image and the one or more shot images.

According to a fourth aspect of the present invention, there is provided an image capturing apparatus comprising: the image processing apparatus according to the second aspect; and an image capturing unit configured to generate the predetermined shot image and the one or more shot images.

According to a fifth aspect of the present invention, there is provided an image processing method comprising: determining a movement direction of an object; setting, within a shooting range, a plurality of processing areas that are arranged in a different direction from the movement direction; selecting a tracking point in each processing area of a predetermined shot image; and tracking, inside each processing area, the tracking point across one or more shot images that are shot after the predetermined shot image.

According to a sixth aspect of the present invention, there is provided an image processing method comprising: setting a plurality of processing areas within a shooting range, and to set a plurality of selection areas within each processing area; selecting a tracking point in each selection area of each processing area of a predetermined shot image; and tracking, inside each processing area, the tracking point across one or more shot images that are shot after the predetermined shot image, wherein, in a case where, in a specific shot image of the one or more shot images, tracking of a specific tracking point selected in a specific processing area of the predetermined shot image fails, selecting a new tracking point to be substituted for the specific tracking point in a specific selection area among the plurality of selection areas of the specific processing area of the specific shot image, and the specific selection area is one of one or more selection areas that are next to or at least partially overlap with another processing area.

According to a seventh aspect of the present invention, there is provided a non-transitory computer-readable storage medium which stores a program for causing a computer to execute an image processing method comprising: determining a movement direction of an object; setting, within a shooting range, a plurality of processing areas that are arranged in a different direction from the movement direction; selecting a tracking point in each processing area of a predetermined shot image; and tracking, inside each processing area, the tracking point across one or more shot images that are shot after the predetermined shot image.

According to an eighth aspect of the present invention, there is provided a non-transitory computer-readable storage medium which stores a program for causing a computer to execute an image processing method comprising: setting a plurality of processing areas within a shooting range, and to set a plurality of selection areas within each processing area; selecting a tracking point in each selection area of each processing area of a predetermined shot image; and tracking, inside each processing area, the tracking point across one or more shot images that are shot after the predetermined shot image, wherein, in a case where, in a specific shot image of the one or more shot images, tracking of a specific tracking point selected in a specific processing area of the predetermined shot image fails, selecting a new tracking point to be substituted for the specific tracking point in a specific selection area among the plurality of selection areas of the specific processing area of the specific shot image, and the specific selection area is one of one or more selection areas that are next to or at least partially overlap with another processing area.

Further features of the present invention will become apparent from the following description of exemplary embodiments with reference to the attached drawings.

BRIEF DESCRIPTION OF THE DRAWINGS

FIGS. 6A to 6D are diagrams illustrating low contrast determination, maximum pixel value projection determination and repetition pattern determination.

FIGS. 12A and 12B are timing charts of template matching processing according to the second embodiment.

FIG. 20A is a diagram showing the case where the digital camera 100 performs motion vector detection on an entire screen.

FIG. 20B is a diagram showing the case where the digital camera 100 performs motion vector detection limited to an object area.

DESCRIPTION OF THE EMBODIMENTS

Figure 1:
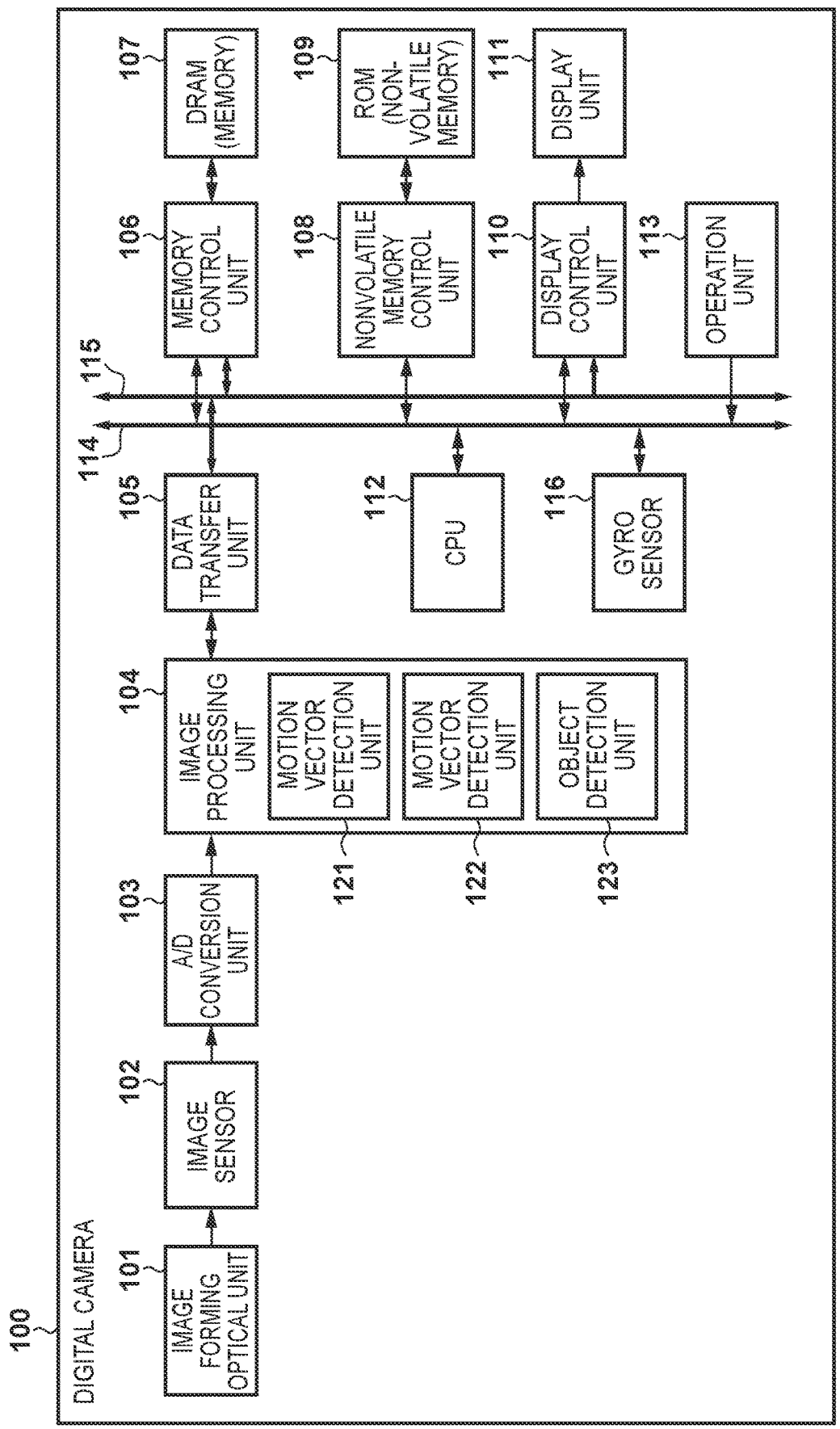
FIG. 1 is a block diagram showing the configuration of a digital camera 100 that includes an image processing apparatus.

Hereinafter, embodiments of the present invention will be described with reference to the attached drawings. Elements that are given the same reference numerals throughout all of the attached drawings represent the same or similar elements. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

The following embodiments relate to cases where feature point tracking processing is performed independently on each of a plurality of areas that are included in the shooting range. The case where the image capturing apparatus is provided with a plurality of motion vector detection units that are constituted by hardware for performing feature point tracking processing is given as an example of such a case.

Figure 15A:
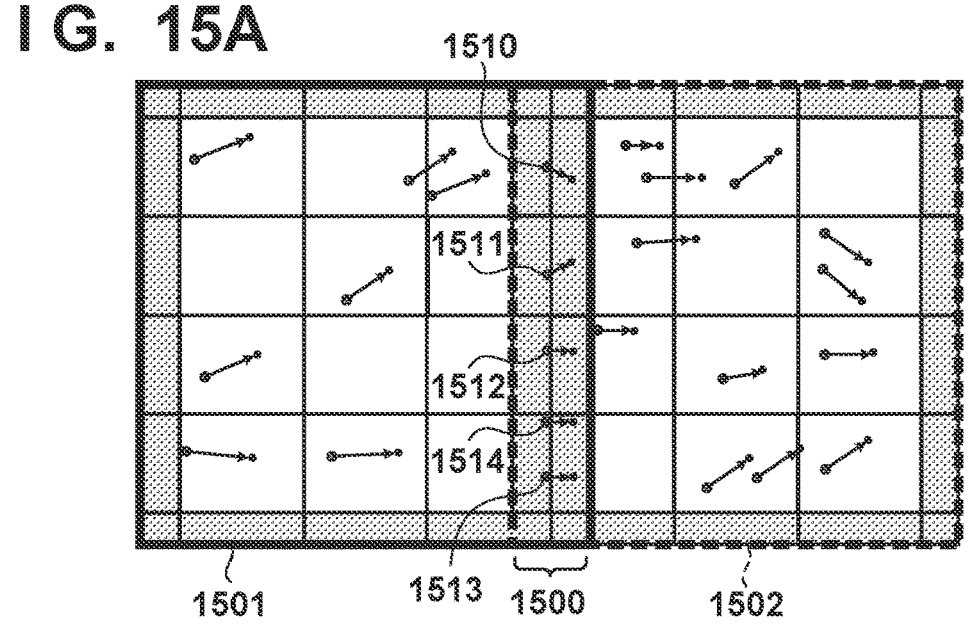
FIGS. 15A and 15B are diagrams illustrating processing for tracking feature points inside each of a plurality of processing areas within a shooting range.

For example, as shown in FIG. 15A, the image capturing apparatus sets two processing areas in one image, and processes each processing area with a different motion vector detection unit. In FIG. 15A, a first motion vector detection unit processes a processing area 1501 enclosed with a solid line on the left side, and a second motion vector detection unit processes a processing area 1502 enclosed with a broken line on the right side. An overlapping area 1500 is an area in which the processing area 1501 overlaps with the processing area 1502. Feature points 1510 to 1514 detected by the first motion vector detection unit are located within the feature point extraction grid squares on the right edge of the processing area 1501 enclosed with the solid line. Here, in the case where the feature points 1510 to 1514 move to the right side as shown in FIG. 15A, template matching cannot be performed since the template matching area corresponding to the movement destination extends outside the processing area 1501, and the feature points are lost.

Figure 15B:
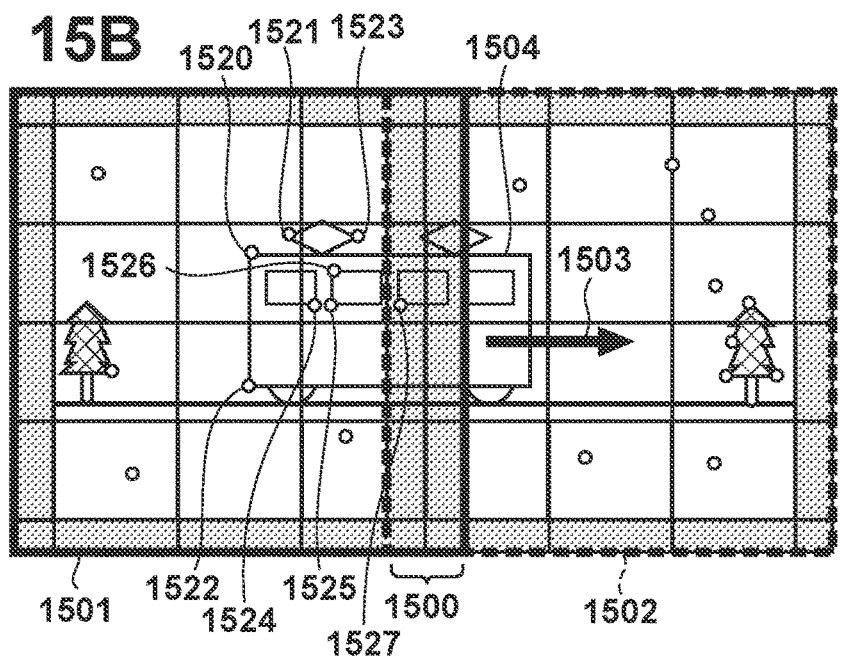

The loss of feature points will be further described in detail, with reference to FIG. 15B. In FIG. 15B, an object 1504 moves to the right side as shown by an arrow 1503. In this case, feature points 1520 to 1527 detected around the object 1504 by the first motion vector detection unit also move to the right side. In this case, the feature points 1520 to 1527 move outside the trackable range of the processing area 1501 after being tracked to the vicinity of the overlapping area 1500, and thus are eventually lost.

In this way, in the case where a plurality of processing areas are arranged in the same direction as the movement direction of an object, the possibility of feature points moving in the direction of another processing area and tracking failure (loss of feature points) occurring increases. As a result, a problem arises in that motion vector detection performance decreases.

First Embodiment

FIG. 1 is a block diagram showing the configuration of a digital camera 100 that includes an image processing apparatus. In FIG. 1, an image forming optical unit 101 is provided with a lens, a diaphragm and the like. At the time of shooting, the image forming optical unit 101 performs focus adjustment and exposure adjustment, and forms an optical image on an image sensor 102. An image sensor 102 has a photoelectric conversion function of converting the optical image into an electrical signal (analog image signal), and is constituted by a CCD sensor, a CMOS sensor or the like. An A/D conversion unit 103 converts an analog image signal from the image sensor 102 into a digital image signal.

A CPU 112 is constituted by a microcomputer or the like that administers overall control of the digital camera 100, issues operation instructions to the various functional blocks, and executes various types of control processing. A bus 114 is a system bus, and a bus 115 is an image data bus.

A DRAM 107 is a memory for storing data, and is provided with sufficient storage capacity to store the data of a predetermined number of still images, a predetermined length of video, audio and the like, constants for use in operations by the CPU 112, computer programs, and the like. A memory control unit 106 performs data writing to and data readout from the DRAM 107, according to instructions from the CPU 112 or a data transfer unit 105.

A nonvolatile memory control unit 108 performs data writing to and data readout from a ROM 109, according to instructions from the CPU 112. The ROM 109 is an electrically erasable recordable memory, and an EEPROM or the like is used. Constants for use in operations by the CPU 112, computer programs and the like are stored in the ROM 109.

The CPU 112 controls an image processing unit 104, the data transfer unit 105, the memory control unit 106, the nonvolatile memory control unit 108, a display control unit 110, an operation unit 113 and the image sensor 102 via the bus 114. The CPU 112 realizes the various processing of the present embodiment, by executing computer programs recorded in the ROM 109.

A display unit 111 consists of a liquid crystal display monitor or the like, is controlled by the display control unit 110, and displays various types of image data and the like. The operation unit 113 includes switches, buttons and the like that are operated by a user, and is used in operations such as power ON/OFF, shutter ON/OFF, and the like.

The image processing unit 104 is constituted by various types of image processing circuits, a buffer memory and the like, and is provided with a motion vector detection unit 121, a motion vector detection unit 122, and an object detection unit 123. The motion vector detection unit 121 and the motion vector detection unit 122 have the same functions, and perform motion vector detection independently. The object detection unit 123 detects motion amounts and feature amounts of a face portion or a body portion of objects, and detects a main object.

The data transfer unit 105 is constituted by a plurality of DMACs (Direct Memory Access Controllers) that perform data transfer. A gyro sensor 116 detects the attitude (horizontally positioned, vertically positioned, etc.) and movement direction of the digital camera 100, and notifies the detection results to the CPU 112.

Figure 3:
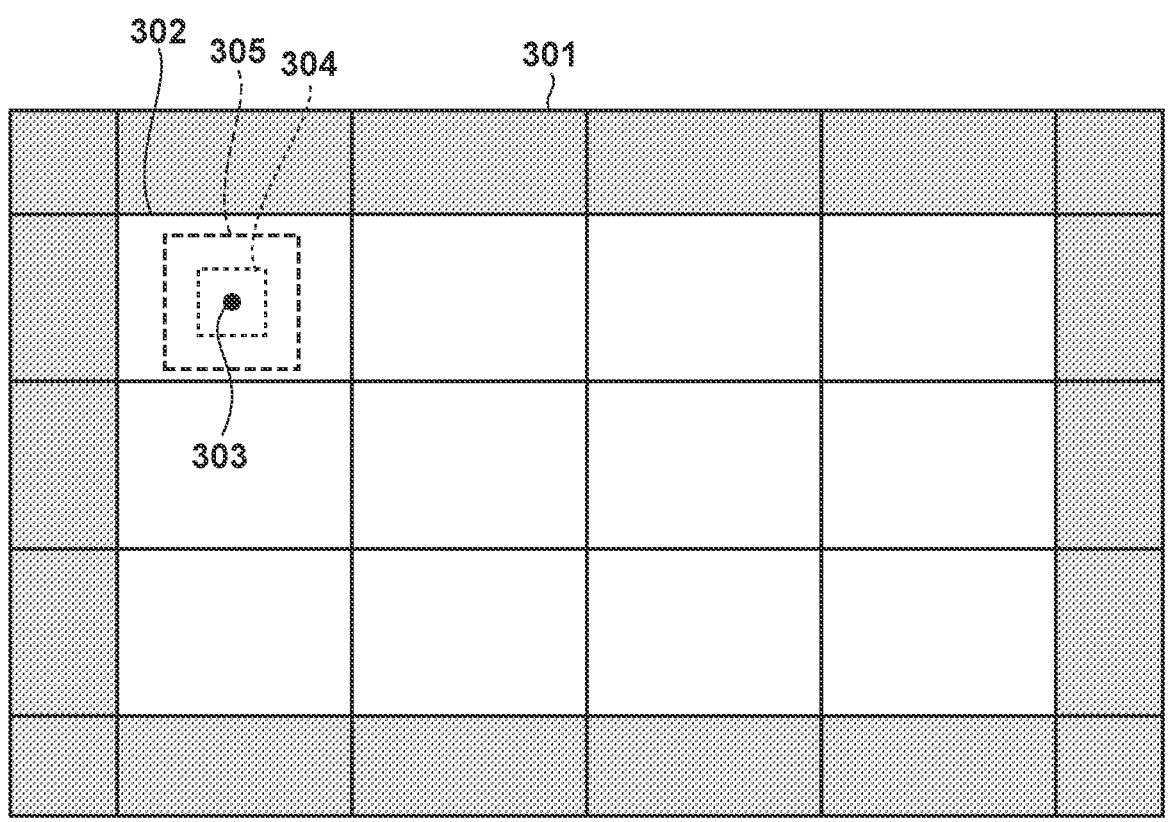
FIG. 3 is a diagram showing the relationship between grid square arrangement, a feature point, a template area and the like that are processed by the motion vector detection units 121 and 122.

FIG. 3 is a diagram showing the relationship between grid square arrangement, a feature point, a template area and the like that are processed by the motion vector detection units 121 and 122. The following description is common to the motion vector detection units 121 and 122.

A set number of feature point extraction grid squares 302 (white grid squares in FIG. 3) and peripheral grid squares 301 (halftone grid squares in FIG. 3) of set size are arranged horizontally and vertically. One feature point 303 is extracted in each feature point extraction grid square 302. The peripheral grid squares 301 are arranged around the feature point extraction grid squares 302, and are areas that do not undergo feature point extraction but are used in template matching. A rectangular search area 305 and template area 304 of set sizes are provided, centered at the extracted feature point 303.

Figure 2:
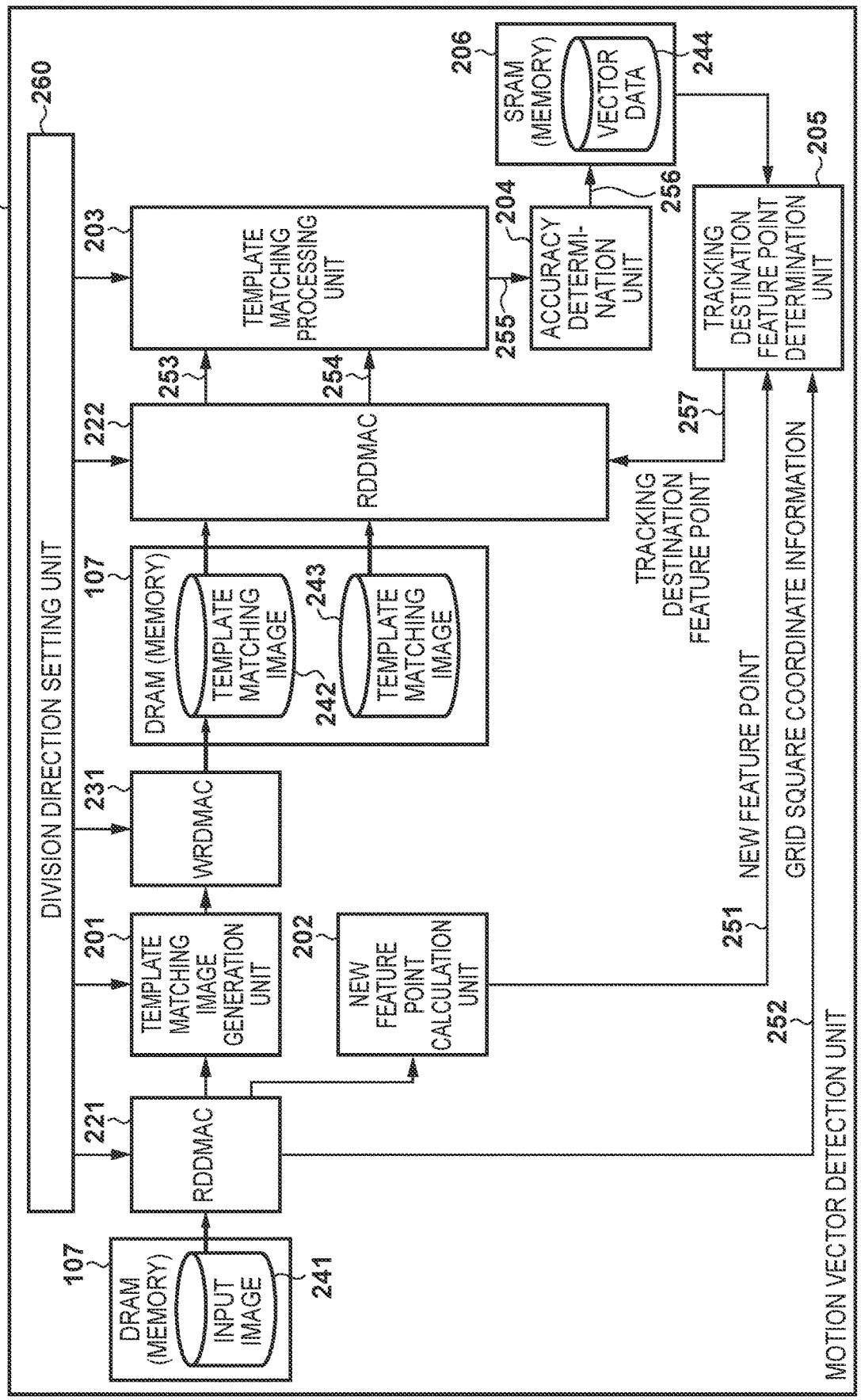
FIG. 2 is a block diagram showing the configuration of motion vector detection units 121 and 122.
Figure 4:
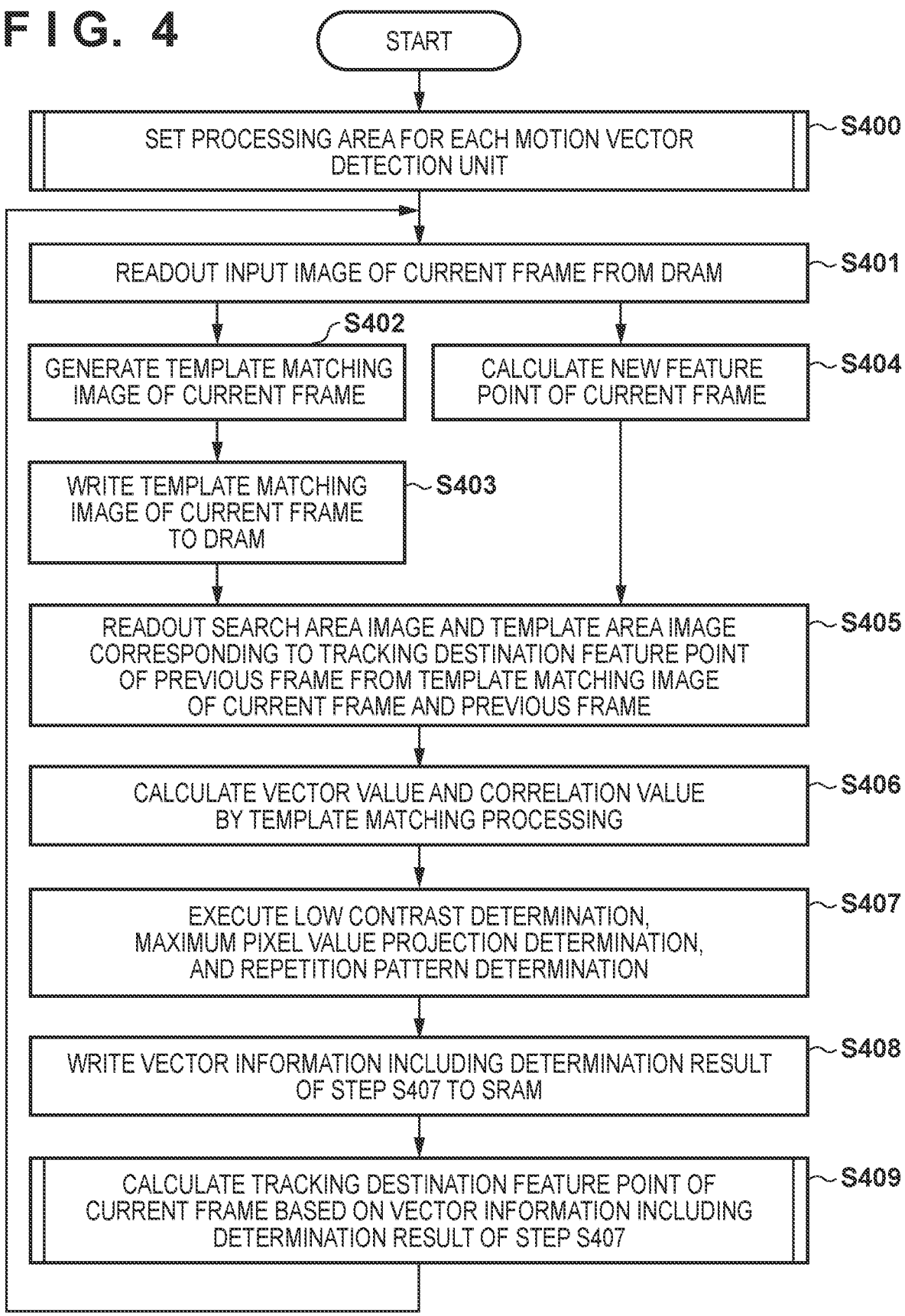
FIG. 4 is a flowchart of feature point tracking processing.

Next, feature point tracking processing will be described, with reference to FIGS. 2 and 4. FIG. 2 is a block diagram showing the configuration of the motion vector detection units 121 and 122, and FIG. 4 is a flowchart of feature point tracking processing. Note that, in FIG. 2, for convenience of description, blocks (e.g., DRAM 107) that are utilized for feature point tracking processing, even those that are not actually included in the motion vector detection units 121 and 122, are shown inside the motion vector detection units 121 and 122. Also, in order to facilitate comprehension of the data flow, the same blocks (e.g., the DRAM 107) may be shown in more than one position. The processing of the flowchart in FIG. 4 is executed when input of a shot image to the image processing unit 104 starts.

In step S400, the CPU 112 determines the direction for dividing the processing area based on information from the gyro sensor 116 and the object detection unit 123, and sets the determined division direction in a division direction setting unit 260. The division direction setting unit 260 sets a target processing area within the shooting range, based on the set division direction. Note that the processing of step S400 will be described in detail later, with reference to FIG. 10.

In step S401, an RDDMAC 221 with which the data transfer unit 105 is equipped reads out an input image 241 of the current frame that is to undergo vector detection from the DRAM 107 via the bus 115. The amount of data that is read out depends on the size of the feature point extraction grid squares 302 and the peripheral grid squares 301 set as shown in FIG. 3. Note that various image processing on the input image 241 is implemented with the image processing unit 104. The input image 241 read out in units of grid squares by the RDDMAC 221 is output to a template matching image generation unit 201 and a new feature point calculation unit 202. Also, the RDDMAC 221 outputs grid square coordinate information 252 indicating the coordinate positions of readout grid squares to a tracking destination feature point determination unit 205 which will be described later.

In step S402, the template matching image generation unit 201 generates a template matching image to be used in template matching at the time of vector detection, and outputs the generated template matching image to a WRDMAC 231 with which the data transfer unit 105 is equipped. The template matching image generation unit 201 includes a bandpass filter circuit, and cuts the high frequency component and low frequency component of image signals that is not required in the template matching processing.

In step S403, the WRDMAC 231 with which the data transfer unit 105 is equipped writes the input template matching image (hereinafter, referred to as template matching image 242) to the DRAM 107 via the bus 115. Also, the template matching image (hereinafter, referred to as template matching image 243) generated in the previous frame is stored in the DRAM 107.

In step S404, the new feature point calculation unit 202 calculates a new feature point (new tracking point) of the current frame. Note that the processing of step S404 can be executed in parallel with the processing of step S402 and step S403.

Figure 5:
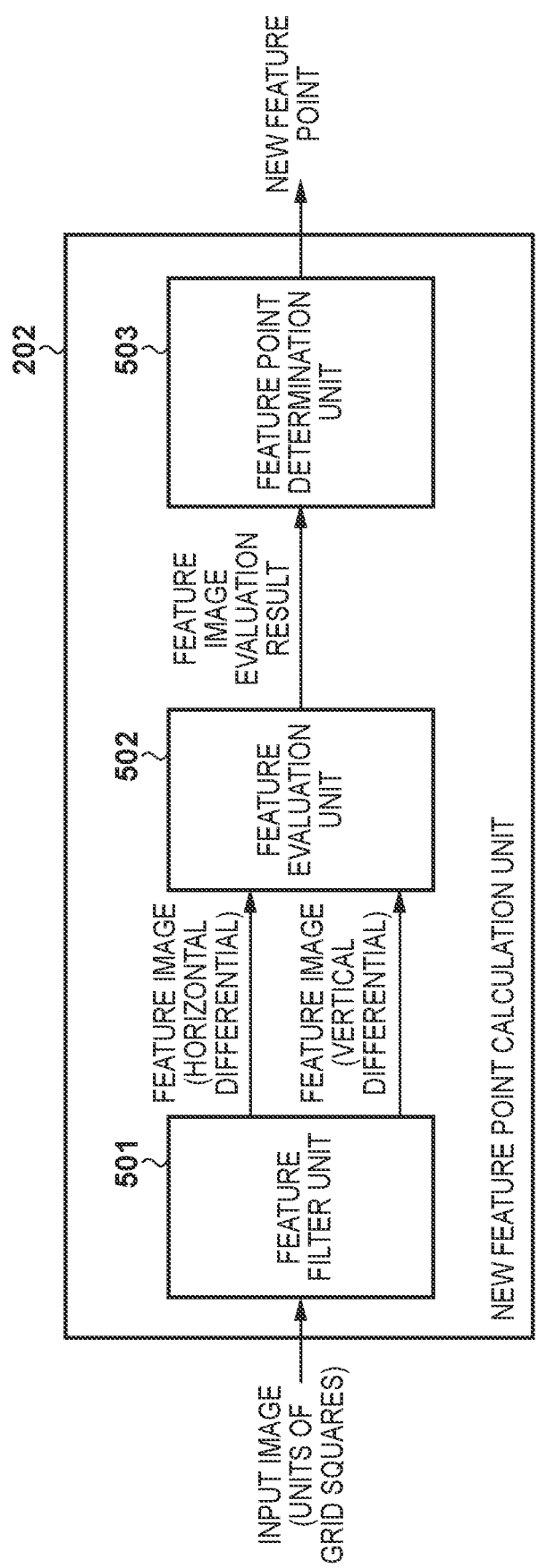
FIG. 5 is a block diagram showing a detailed configuration of a new feature point calculation unit 202.

Here, the new feature point calculation unit 202 will be described in detail, with reference to FIG. 5. The new feature point calculation unit 202 includes a feature filter unit 501, a feature evaluation unit 502, and a feature point determination unit 503.

The feature filter unit 501 is constituted by a plurality of filters, such as a bandpass filter, a horizontal differential filter, a vertical differential filter and a smoothing filter. In the present embodiment, the bandpass filter cuts the unnecessary high frequency component and low frequency component of the input image (units of grid squares). Thereafter, a signal obtained by horizontal differential filtering processing using the horizontal differential filter and a signal obtained by vertical differential filtering processing using the vertical differential filter are generated. Smoothing filtering processing is then performed using the smoothing filter on signals that have undergone the horizontal and vertical differential filtering processing. The feature filter unit 501 respectively outputs the signals thus obtained as horizontal and vertical feature images.

The feature evaluation unit 502 calculates, for each pixel, with respect to the feature image (units of grid squares) obtained through filtering processing by the feature filter unit 501, a point at which the differential values around the pixel are large in multiple directions, such as a point of intersection of two edges or a point on a curve where the curvature is maximum, as a feature value using a feature evaluation equation. Hereinafter, calculation of feature values will be described, taking the Shi and Tomasi method as an example. The feature evaluation unit 502 creates an autocorrelation matrix H shown in Equation 1 from results obtained by performing horizontal differential filtering and vertical differential filtering.

$$H = G * \begin{pmatrix} Ix^2 & IxIy \\ IxIy & Iy^2 \end{pmatrix} \tag{1}$$

In Equation 1, Ix represents the result of performing horizontal differential filtering and Iy represents the result of performing vertical differential filtering, and a computation for convolving a Gaussian filter G is performed. A Shi and Tomasi feature evaluation equation is shown in Equation 2.

$$\text{Shi and Tomasi} = \min(\lambda 1, \lambda 2) \tag{2}$$

Equation 2 indicates taking the smaller of the eigenvalues $\lambda 1$ and $\lambda 2$ of the autocorrelation matrix H of Equation 1 as the feature value.

The feature point determination unit 503 determines (selects), for each grid square (feature point selection area), a pixel having the largest feature value Pc among the feature values calculated for each pixel by the feature evaluation unit 502, as a feature point. In the present embodiment, the coordinates of feature point are represented by relative coordinates (PX,PY) whose origin (0,0) is the upper left end of the grid squares, but may be represented with absolute coordinates in an image signal.

Note that the coordinates (PX,PY) and the feature value Pc of the calculated new feature point are stored in a memory with which the new feature point calculation unit 202 is equipped. The memory has the capacity for storing the coordinates (PX,PY) and the feature value Pc of feature points of the previous frame and the current frame. In a template matching processing unit 203, a new feature point 251 is output to the tracking destination feature point determination unit 205 together with the feature value Pc, when template matching processing of the corresponding grid square is started.

In step S405, the RDDMAC 222 reads out a rectangular area of set size, centered at a tracking destination feature point 257 calculated in the previous frame, from the template matching image 242 of the current frame and a template matching image 243 of the previous frame. The tracking destination feature point 257 is input from the tracking destination feature point determination unit 205. When initially performing template matching processing, however, the tracking destination feature point has not been calculated in the previous frame, and thus the new feature point 251 of the previous frame is used instead of the tracking destination feature point 257.

Note that the rectangular area that is read out from the template matching image 242 of the current frame corresponds to the search area 305, and the rectangular area read out from the template matching image 243 of the previous frame corresponds to the template area 304. The image of the rectangular area corresponding to the search area 305 and the image of the rectangular area corresponding to the template area 304 are respectively output to the template matching processing unit 203 as a search area image 253 and a template area image 254.

In step S406, the template matching processing unit 203 calculates a correlation value using the search area image 253 and the template area image 254, and calculates a vector value based on that correlation value. In the present embodiment, the sum of absolute difference (SAD) shown in Equation 3 can be used as a method of calculating the correlation value.

$$S\_SAD = \Sigma_i \Sigma_j |f(i,j) - g(i,j)| \quad (3)$$

In Equation 3, $f(i,j)$ represents the pixel value at the coordinates $(i,j)$ within the template area image 254, and $g(i,j)$ represents the corresponding pixel value within the area that is to undergo correlation value calculation in the search area image 253. The correlation value calculation area is the same size as the template area image 254. With SAD, the correlation value $S\_SAD$ can then be obtained by calculating the absolute difference value for each pixel value $f(i,j)$ and $g(i,j)$ within both blocks, and deriving the sum thereof. Accordingly, the difference in luminance value between both blocks decreases as the value of the correlation value $S\_SAD$ decreases, which indicates, in other words, that the texture is similar within the template area image 254 and the correlation value calculation area.

Note that although, in the present embodiment, SAD is used as an example of a correlation value, the present invention is not limited thereto, and another correlation value such as the sum of squared difference (SSD) or normalized cross-correlation (NCC) may be used. The template matching processing unit 203 calculates a vector value of the tracking destination feature point of the previous frame, based on the position of the minimum correlation value. The template matching processing unit 203 outputs vector information 255 (calculated vector value and correlation value) to an accuracy determination unit 204.

In step S407, the accuracy determination unit 204 calculates the maximum, minimum, average and local minimum correlation values based on the correlation values calculated in step S406, and performs low contrast determination, maximum pixel value projection determination and repetition pattern determination.

In FIGS. 6A to 6D, the relationship between pixel values and respective determinations is shown with graphs. In the present embodiment, however, the degree of similarity increases as the correlation value decreases, and thus, in FIGS. 6A to 6D, the maximum pixel value represents the minimum correlation value, the minimum pixel value represents the maximum correlation value, and the local maximum pixel value represents the local minimum correlation value.

In the low contrast determination, if the difference between the maximum and minimum correlation values within the correlation value calculation area is smaller than a threshold value set in advance, it is determined that the correlation value calculation area is low contrast. In the maximum pixel value projection determination, the prominence of the minimum correlation value within the correlation value calculation area is determined. If the result of dividing the difference between the maximum and average pixel values by the difference between the maximum and minimum pixel values is smaller than a threshold value set in advance, it is determined that the correlation value calculation area is a low peak. If the division result is larger than the threshold value, it is determined that the correlation value calculation area is a high peak. In the repetition pattern determination, if the difference between the minimum and local minimum pixel values within the correlation value calculation area is smaller than a threshold value set in advance, it is determined that the correlation value calculation area is a repeating pattern.

FIG. 6A shows the case where the result of each determination is favorable. FIG. 6B shows the case where it is determined that the correlation value calculation area is low contrast by the low contrast determination. In FIG. 6B, there is little difference between the maximum and minimum pixel values compared with FIG. 6A. FIG. 6C shows the case where it is determined that the correlation value calculation area is a low peak by the maximum pixel value projection determination. Compared with FIG. 6A, the result of dividing the difference between the maximum and average pixel values by the difference between the maximum and minimum pixel values is small in FIG. 6C. FIG. 6D shows the case where it is determined that the correlation value calculation area is a repetition pattern by the repetition pattern determination. Compared with FIG. 6A, the difference between the maximum pixel value and the local maximum pixel value is small in FIG. 6D.

In step S408, the accuracy determination unit 204 outputs vector information 256 including the determination results of the low contrast determination, the maximum pixel value projection determination and the repetition pattern determination to an SRAM 206. The vector information 256 is stored in the SRAM 206 as vector data 244.

In step S409, the tracking destination feature point determination unit 205 calculates the tracking destination feature point of the current frame that is for use in template matching processing of the next frame, based on the tracking destination feature point 257 and the vector data 244 of the previous frame. The tracking destination feature point calculated here is used as the tracking destination feature point 257 of the previous frame, when template matching processing is next executed in step S405. Note that the processing of step S409 will be described in detail later, with reference to FIG. 7.

As a result of the above processing, template matching processing of the current frame (i.e., processing for tracking the feature points of the previous frame in the current frame) is completed. Thereafter, when the shot image of the next frame is input to the image processing unit 104, the processing of steps S401 to S409 is executed again, with the image of the next frame as the image of the current frame. Accordingly, in the present embodiment, processing for tracking feature points across one or more shot images that are shot after a predetermined shot image that serves as a reference (e.g., first shot image) is performed. Also, the feature point tracking processing of FIG. 4 is performed independently for each processing area by the motion vector detection units 121 and 122. Accordingly, in the present embodiment, processing for tracking feature points is performed inside each processing area.

Figure 7:
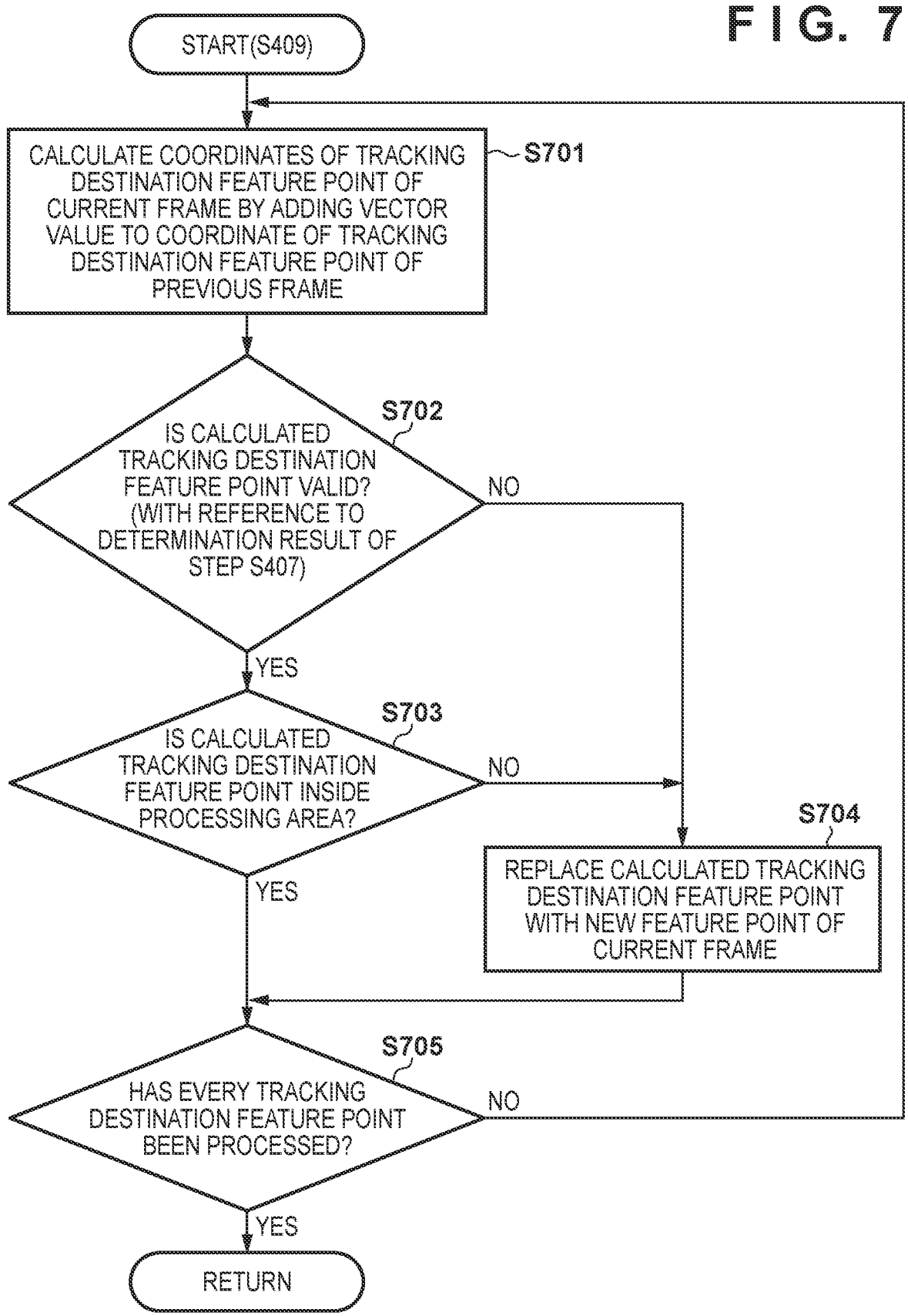
FIG. 7 is a flowchart showing details of tracking destination feature point calculation processing (step S409 of FIG. 4) according to a first embodiment.

Next, the processing of step S409 will be described in detail, with reference to FIG. 7. In step S701, the tracking destination feature point determination unit 205 acquires the vector data 244 from the SRAM 206. The tracking destination feature point determination unit 205 then calculates the coordinates of the tracking destination feature point of the current frame, by adding the vector value that is shown by the vector data 244 to the coordinates of the tracking destination feature point 257 of the previous frame. Note that the processing of step S701 and the following steps S702 to S705 is executed for each tracking destination feature point.

In step S702, the tracking destination feature point determination unit 205 determines whether the tracking destination feature point calculated in step S701 is valid (whether the calculated tracking destination feature point can be used in template matching processing of the next frame), based on the determination result (determination result of step S407) that is included in the vector data 244. If it is determined that the correlation value calculation area is low contrast by the low contrast determination, it is determined that the tracking destination feature point is not valid. Also, if it is determined that the correlation value calculation area is a low peak in the maximum projection determination, and, if it is also determined that the correlation value calculation area is a repetition pattern in the repetition pattern determination, it is determined that the tracking destination feature point is not valid. In other cases, it is determined that the tracking destination feature point is valid. If the tracking destination feature point is valid, the processing advances to step S703, and, if the tracking destination feature point is not valid, the processing advances to step S704.

In step S703, the tracking destination feature point determination unit 205 determines whether the tracking destination feature point calculated in step S701 is included inside the processing area. If the tracking destination feature point calculated in step S701 is included inside the processing area, the processing advances to step S705, and, if this is not the case, the processing advances to step S704. Note that, in the case where the correlation value calculation area is always set inside the processing area in the template matching processing (step S406 of FIG. 4), the tracking destination feature point will also always be included inside the processing area.

In step S704, the tracking destination feature point determination unit 205 replaces the tracking destination feature point calculated in step S701 with a new feature point of the current frame calculated in step S404 of FIG. 4. That is, if "NO" is determined in step S702 or step S703, the tracking destination feature point determination unit 205 judges that tracking of the feature point failed, and selects a new feature point to be substituted for the tracking destination feature point of the previous frame in the current frame. At this time, the tracking destination feature point determination unit 205 selects, as a new feature point to be substituted for the feature point with respect to which tracking failed, the new feature point calculated in the feature point extraction grid square in which the feature point with respect to which tracking failed was first calculated, among the plurality of new feature points calculated in step S404. For example, consider the case where tracking of a specific feature point calculated in a specific feature point extraction grid square of the first shot image fails in a subsequent specific shot image. In this case, the new feature point calculated in this specific feature point extraction grid square by the processing of step S404 in which this specific shot image is used as the current frame is substituted for this specific feature point with respect to which tracking failed.

In step S705, the tracking destination feature point determination unit 205 determines whether all of the tracking destination feature points have been processed. If all of the tracking destination feature points have been processed, the processing of this flowchart is completed. If any unprocessed tracking destination feature points remain, the processing from step S701 onward is similarly performed for the next unprocessed tracking destination feature point.

Figure 8A:
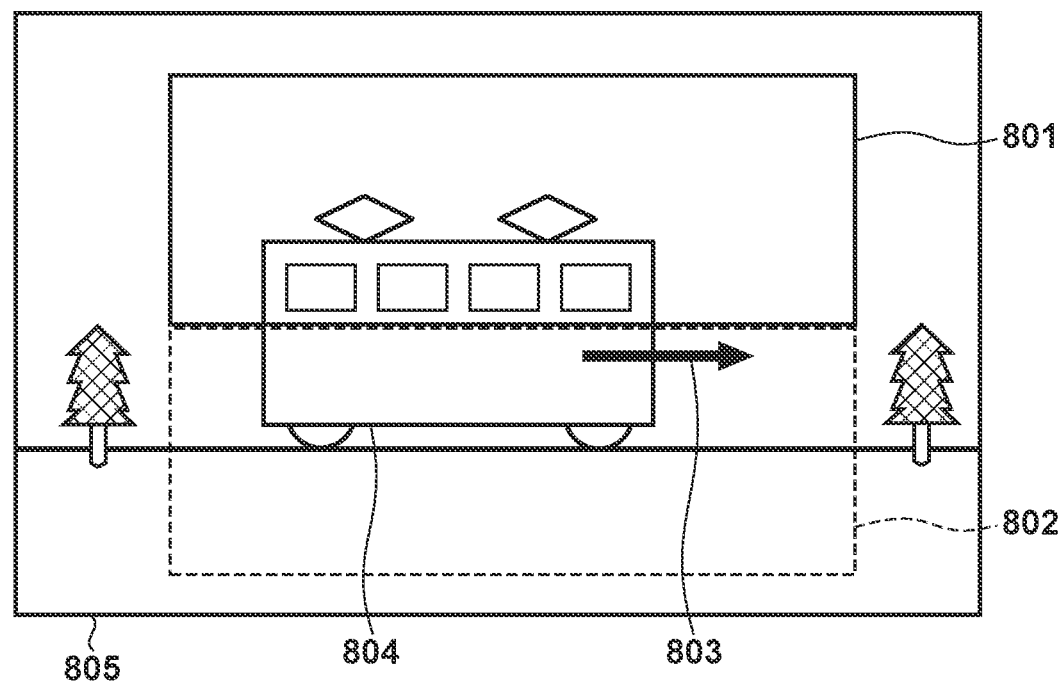
FIGS. 8A and 8B are diagrams showing exemplary setting of processing areas in the case of shooting with the digital camera 100 in landscape orientation.
Figure 8B:
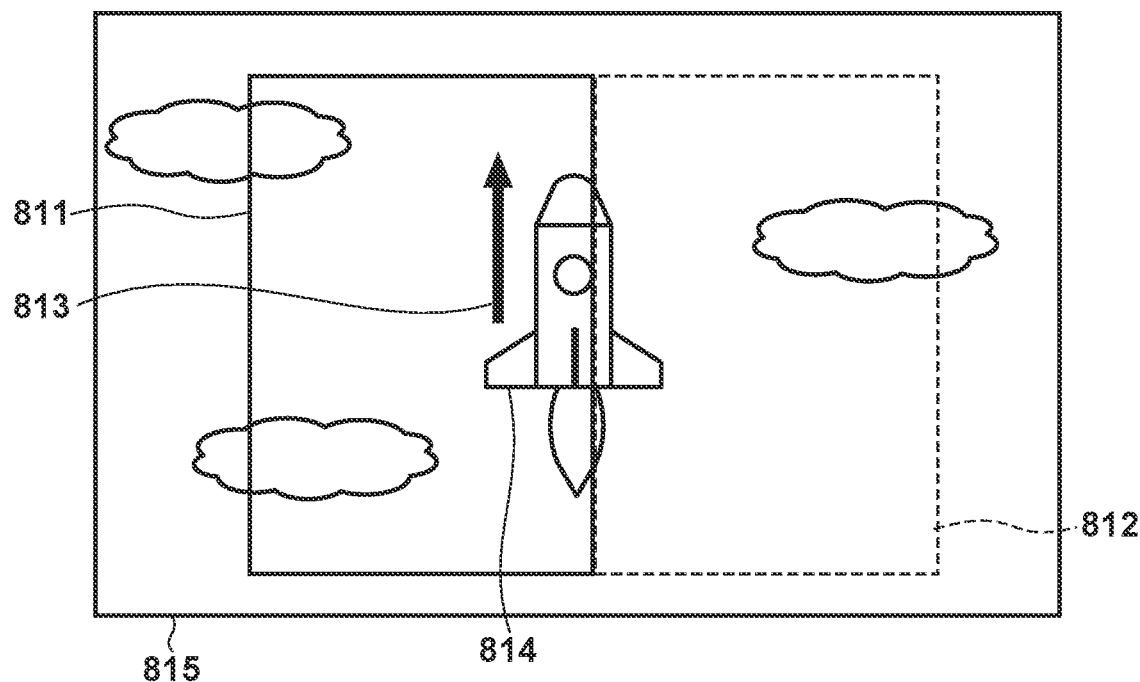
Figure 9A:
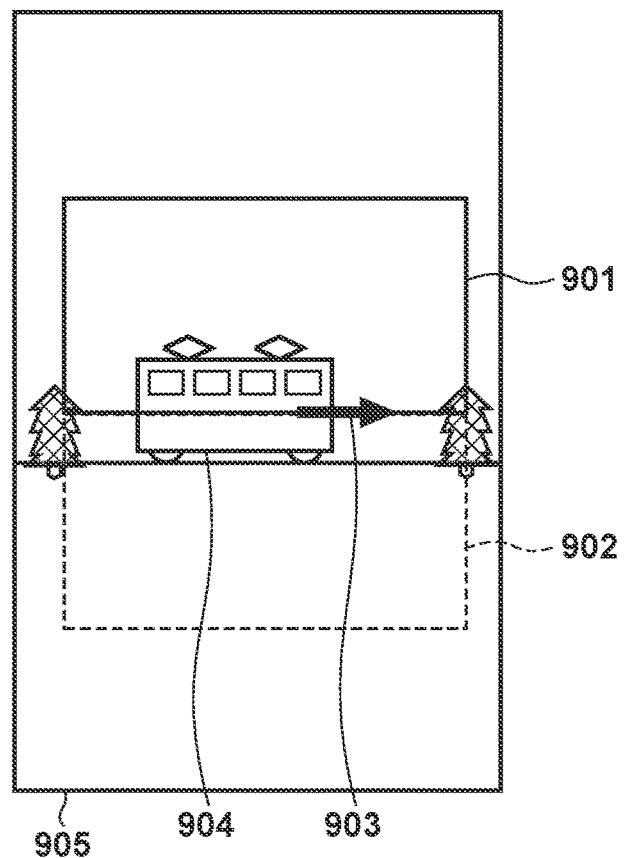
FIGS. 9A and 9B are diagrams showing exemplary setting of processing areas in the case of shooting with the digital camera 100 in portrait orientation.
Figure 9B:
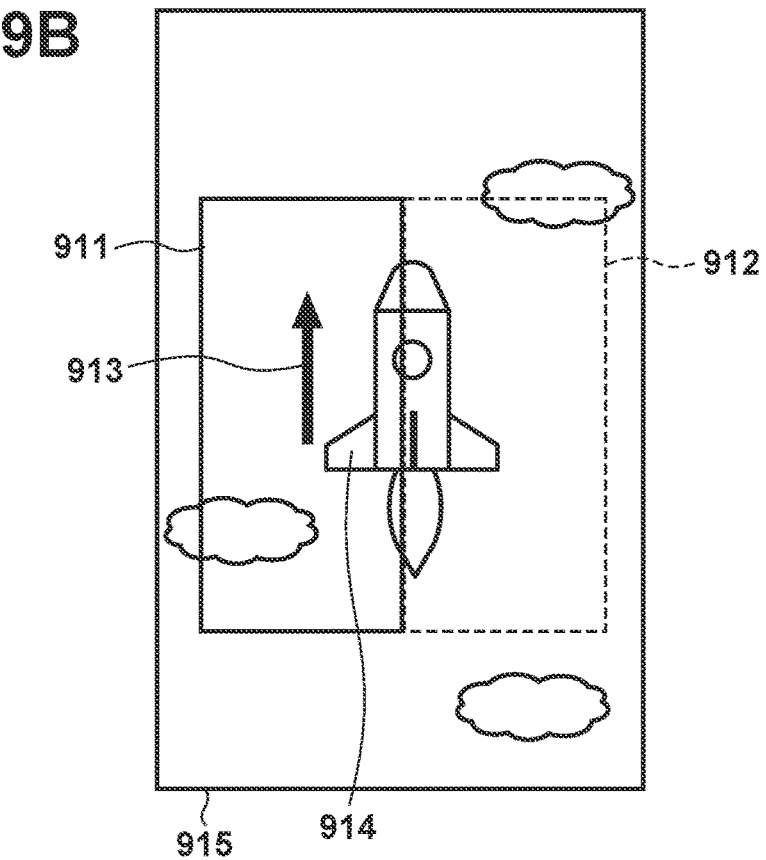
Figure 10:
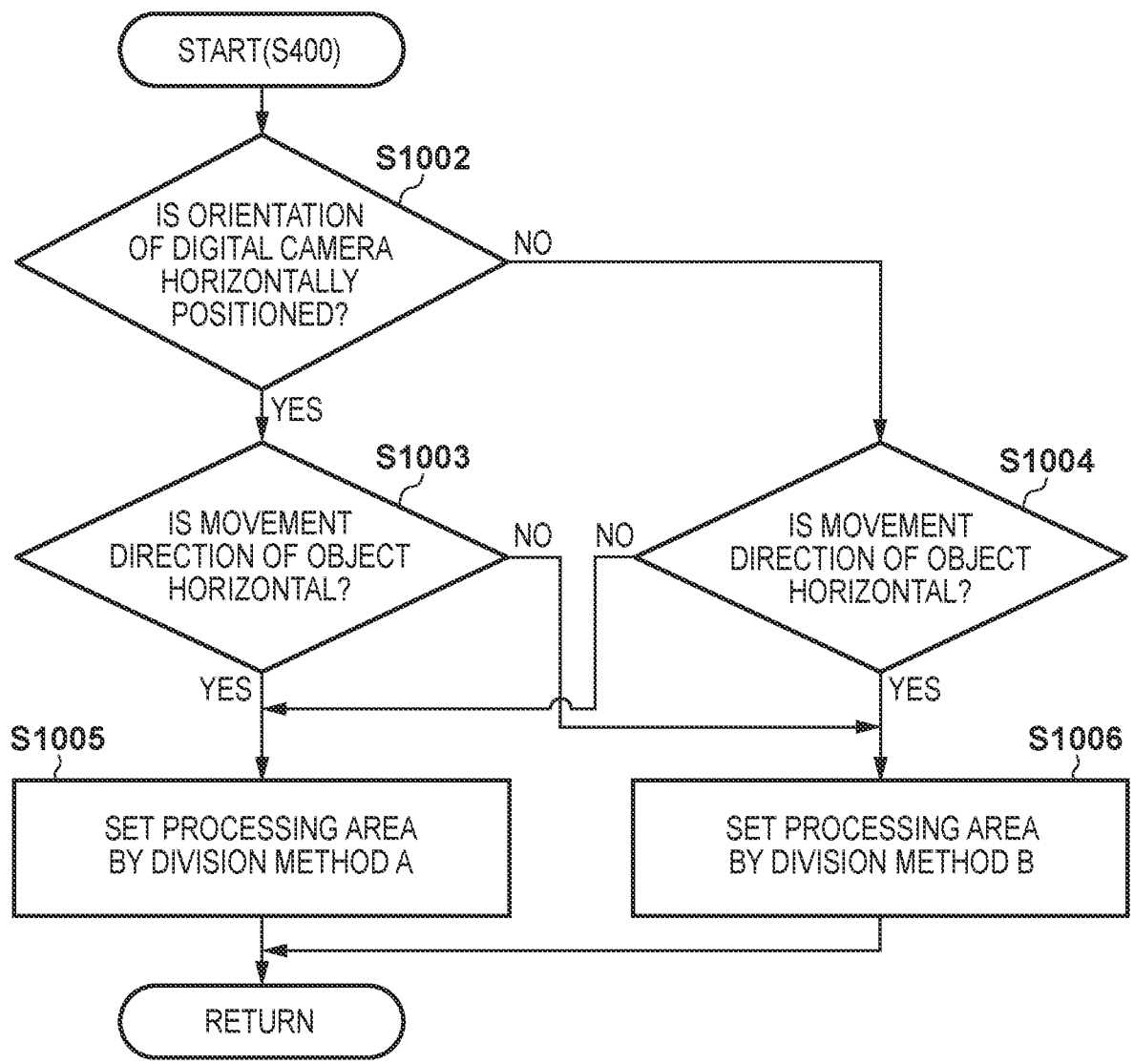
FIG. 10 is a flowchart showing details of division direction determination processing (step S400 of FIG. 4) according to the first embodiment.

Next, the processing of step S400 will be described in detail, with reference to FIGS. 8A to 10. FIGS. 8A and 8B are diagrams showing exemplary setting of processing areas in the case of shooting with the digital camera 100 in landscape orientation. FIGS. 9A and 9B are diagrams showing exemplary setting of processing areas in the case of shooting with the digital camera 100 in portrait orientation. FIG. 10 is a flowchart showing the processing of step S400 in detail.

The division method for dividing the processing area horizontally when the digital camera 100 is held horizontally, as shown in FIG. 8A, is called division method A, and the division method for dividing the processing area vertically when the digital camera 100 is held horizontally, as shown in FIG. 8B, is called division method B. The division method for dividing the processing area horizontally when the digital camera 100 is held vertically, as shown in FIG. 9A, is called division method B similarly to FIG. 8B. The division method for dividing the processing area vertically when the digital camera 100 is held vertically, as shown in FIG. 9B, is called division method A similarly to FIG. 8A.

In step S1002, the CPU 112 determines whether the digital camera 100 is horizontally positioned based on information from the gyro sensor 116. In the case of being horizontally positioned, the processing advances to step S1003, and, if this is not the case, the processing advances to step S1004. Note that, in cases such as where the digital camera 100 is oriented diagonally, the CPU 112 determines whether the orientation of the digital camera 100 is close to landscape orientation or is close to portrait orientation, and, if close to landscape orientation, determines that the digital camera 100 is horizontally positioned.

In step S1003, the CPU 112 determines whether the movement direction of the object is horizontal based on information from the object detection unit 123. In the case of horizontal movement, the processing advances to step S1005, and, if this is not the case, the processing advances to step S1006. Note that, in the case where the movement direction of the object is diagonal, the CPU 112 determines whether the horizontal movement component is greater or the vertical movement component is greater, and, if the horizontal movement component is greater, determines that the movement direction of the object is horizontal.

In step S1004, the CPU 112 determines whether the movement direction of the object is horizontal based on information from the object detection unit 123. This determination processing is substantially the same as the determination processing of step S1003, and the movement direction of the object being horizontal or vertical is determined on the basis of the direction of gravity.

In step S1005, the CPU 112 sets the processing areas by division method A, by controlling the division direction setting unit 260 of the motion vector detection units 121 and 122. For example, FIG. 8A shows an example of the case where the processing transitions from step S1003 to step S1005. As shown in FIG. 8A, in the case where an object 804 is moving horizontally as indicated by an arrow 803 with respect to a screen 805, a processing area 801 and a processing area 802 are set so as to be arranged in the vertical direction. Also, FIG. 9B shows an example of the case where the processing transitions from step S1004 to step S1005. As shown in FIG. 9B, in the case where an object 914 is moving vertically as indicated by an arrow 913 with respect to a screen 915, a processing area 911 and a processing area 912 are set so as to be arranged in the horizontal direction.

In step S1006, the CPU 112 sets the processing areas by division method B, by controlling the division direction setting unit 260 of the motion vector detection units 121 and 122. For example, FIG. 8B shows an example of the case where the processing transitions from step S1003 to step S1006. As shown in FIG. 8B, in the case where an object 814 is moving vertically as indicated by an arrow 813 with respect to a screen 815, a processing area 811 and a processing area 812 are set so as to be arranged in the horizontal direction. Also, FIG. 9A shows an example of the case where the processing transitions from step S1004 to step S1006. As shown in FIG. 9A, in the case where an object 904 is moving horizontally as indicated by an arrow 903 with respect to a screen 905, a processing area 901 and a processing area 902 are set so as to be arranged in the vertical direction.

After the processing of step S1005 or step S1006 is performed, the motion vector detection units 121 and 122 independently execute the processing from step S401 of FIG. 4 onward for one of the two processing areas that were set. Note that, in FIGS. 8A and 8B and FIGS. 9A and 9B, the two processing areas are shown adjacent to each other and without an overlapping area existing therebetween. However, as long as the two processing areas are arranged in a different direction from the movement direction of the object, the two processing areas may be separated from each other rather than being adjacent, and may include an overlapping area such as the overlapping area 1500 of FIGS. 15A and 15B. Also, the number of the processing areas that are set is not limited to two. In the case where the digital camera 100 is capable of independently processing more processing areas, the digital camera 100 may set more processing areas according to processing capacity.

According to the first embodiment, as described above, the digital camera 100 determines the movement direction of the object, and sets a plurality of processing areas that are arranged in a different direction from the movement direction of the object, within the shooting range. It thereby becomes possible to reduce the possibility of feature points moving in the direction of another processing area and tracking failure (loss of feature points) occurring.

Note that, in the above description, the digital camera 100 is given as determining the division method based on position information of the digital camera 100 (whether the digital camera 100 is horizontally positioned or vertically positioned) and movement information of the object (whether the object is moving in the horizontal direction or the vertical direction). However, the digital camera 100 may determine the division method with reference to movement direction information of the digital camera 100, information obtained by averaging the movement direction of a plurality of feature points, vector information obtained by averaging a plurality of motion vectors, and the like.

In the case where the movement direction information of the digital camera 100 is the horizontal direction, the possibility that the movement direction of the feature point will also be the horizontal direction increases. Thus, the digital camera 100 selects division method A if the digital camera 100 is horizontally positioned and division method B if the digital camera 100 is vertically positioned. Also, in the case where movement direction information of the digital camera 100 is the vertical direction, the possibility that the movement direction of the feature point will also be the vertical direction increases. Thus, the digital camera 100 selects division method B if the digital camera 100 is horizontally positioned and division method A if the digital camera 100 is vertically positioned. In the case where the movement direction of the digital camera 100 is diagonal, the digital camera 100 determines the movement direction to be the horizontal direction if the movement component of the horizontal direction is greater than the movement component of the vertical direction.

In the case where the information obtained by averaging the movement direction of a plurality of feature points is the horizontal direction, the digital camera 100 selects division method A if the digital camera 100 is horizontally positioned and division method B if the digital camera 100 is vertically positioned. In the case where the information obtained by averaging the movement direction of a plurality of feature points is the vertical direction, the digital camera 100 selects division method B if the digital camera 100 is horizontally positioned and division method A if the digital camera 100 is vertically positioned. In the case where the information obtained by averaging the movement direction of a plurality of feature points is the diagonal direction, the digital camera 100 determines the movement direction to be the horizontal direction if the movement component of the horizontal direction is greater than the movement component of the vertical direction.

In the case where the vector information obtained by averaging a plurality of motion vectors is the horizontal direction, the possibility that the movement direction of the feature point will also be the horizontal direction increases. Thus, the digital camera 100 selects division method A if the digital camera 100 is horizontally positioned and division method B if the digital camera 100 is vertically positioned. In the case where the vector information obtained by averaging a plurality of motion vectors is the vertical direction, the possibility that the movement direction of the feature point will also be the vertical direction increases. Thus, the digital camera 100 selects division method B if the digital camera 100 is horizontally positioned and division method A if the digital camera 100 is vertically positioned. In the case where the vector information obtained by averaging a plurality of motion vectors is the diagonal direction, the digital camera 100 determines the movement direction to be the horizontal direction, if the movement component of the horizontal direction is greater than the movement component of the vertical direction.

Second Embodiment

A second embodiment describes an other example of the processing for determining the division direction of the processing area (step S400 of FIG. 4). In the present embodiment, the basic configuration of the digital camera 100 is similar to the first embodiment (see FIGS. 1 and 2). Hereinafter, the differences from the first embodiment will mainly be described.

Figure 11A:
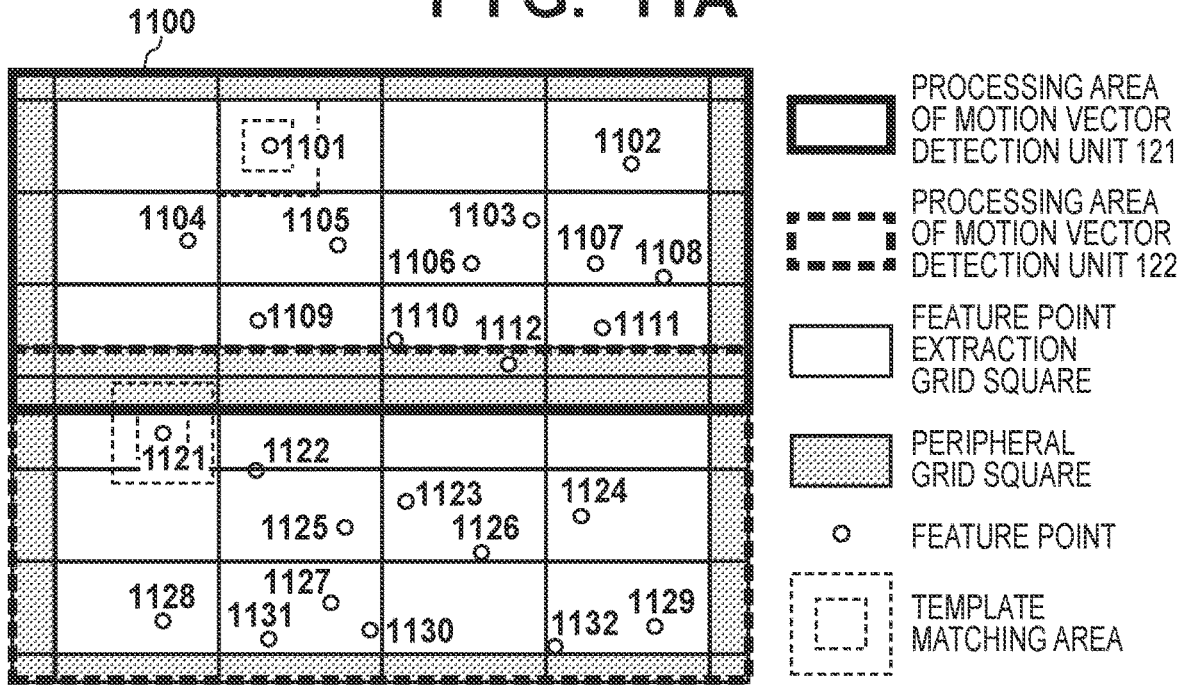
FIGS. 11A and 11B are diagrams showing exemplary setting of processing areas according to a second embodiment.
Figure 11B:
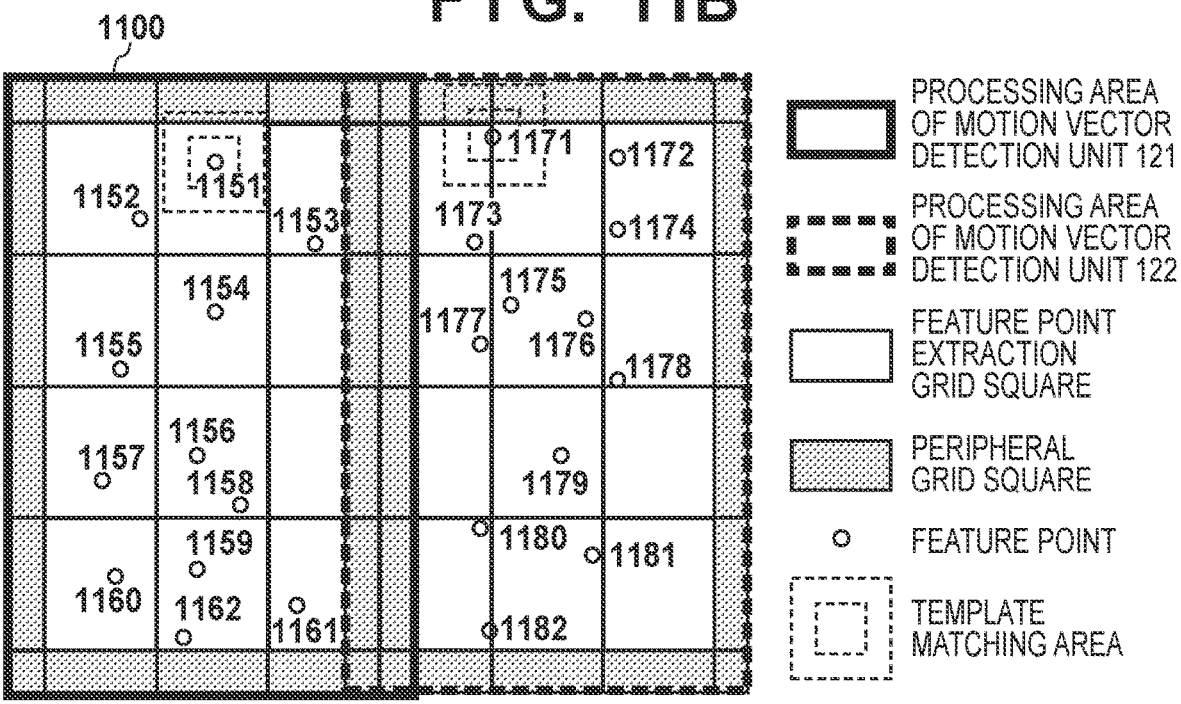

FIGS. 11A and 11B are diagrams showing exemplary setting of processing areas according to the second embodiment. FIG. 11A is equivalent to division method A of the first embodiment, with the upper half of a screen 1100 being processed by the motion vector detection unit 121, and the lower half being processed by the motion vector detection unit 122. In the motion vector detection unit 121, 12 iterations of template matching processing are implemented, centered at feature points 1101 to 1112. In the motion vector detection unit 122, 12 iterations of template matching processing are implemented, centered at feature points 1121 to 1132.

FIG. 11B is equivalent to division method B of the first embodiment, with the left half of the screen 1100 being processed by the motion vector detection unit 121, and the right half processed by the motion vector detection unit 122. In the motion vector detection unit 121, 12 iterations of template matching processing are implemented, centered at feature points 1151 to 1162. In the motion vector detection unit 122, 12 iterations of template matching processing are implemented, centered at feature points 1171 to 1182.

FIGS. 12A and 12B are timing charts of template matching processing according to the second embodiment. FIG. 12A corresponds to division method A shown in FIG. 11A, and FIG. 12B corresponds to division method B shown in FIG. 11B.

In FIG. 12A, the input image 241 is input to the DRAM 107 from the upper end portion of the image, in one frame (1V) period of video. When input of the input image 241 starts, in the motion vector detection unit 121 which processes the upper half of the image, the RDDMAC 221 reads out the input image 241, and the template matching image generation unit 201 generates the template matching image 242. The template matching image 242 is written to the DRAM 107 by the WRDMAC 231. Next, the RDDMAC 222 reads out an image area centered on the feature points 1101 to 1112, and template matching processing is implemented during periods 1 to 12 enclosed with solid lines.

Next, when input of the lower half of the input image 241 to the DRAM 107 starts, in the motion vector detection unit 122 which processes the lower half of the image, similar processing to the motion vector detection unit 121 is performed. In the motion vector detection unit 122, the RDDMAC 222 reads out an image area centered on the feature points 1121 to 1132, and template matching processing is implemented during periods 13 to 24 enclosed with broken lines.

Note that the time required for template matching processing becomes longer as the search area becomes larger, since the number of iterations of matching increases. Thus, there are cases where template matching processing is not completed within the 1V period as shown in FIG. 12A. In particular, since the motion vector detection unit 122 which performs processing of the lower half is made to wait to start processing until the lower half of the input image 241 is input, cases where template matching processing is not completed within the 1V period increase.

On the other hand, in the case of division method B, as shown in FIG. 12B, the motion vector detection unit 121 and the motion vector detection unit 122 are both able to start template matching processing immediately after the input image 241 starts being input to the DRAM 107. In the motion vector detection unit 121, the RDDMAC 222 reads out an image area centered on feature points 1151 to 1162, and template matching processing is implemented during periods 1 to 12 enclosed with solid lines. In the motion vector detection unit 122, the RDDMAC 222 reads out an image area centered on feature points 1171 to 1182, and template matching processing is implemented during periods 13 to 24 enclosed with broken lines. In this way, in the case of division method B, two motion vector detection units can start processing from the timing of the start of the 1V period. Thus, it may be possible to complete the processing within the 1V period, even in the case of a search area size that results in processing not being completed within the 1V period with division method A.

Figure 13:
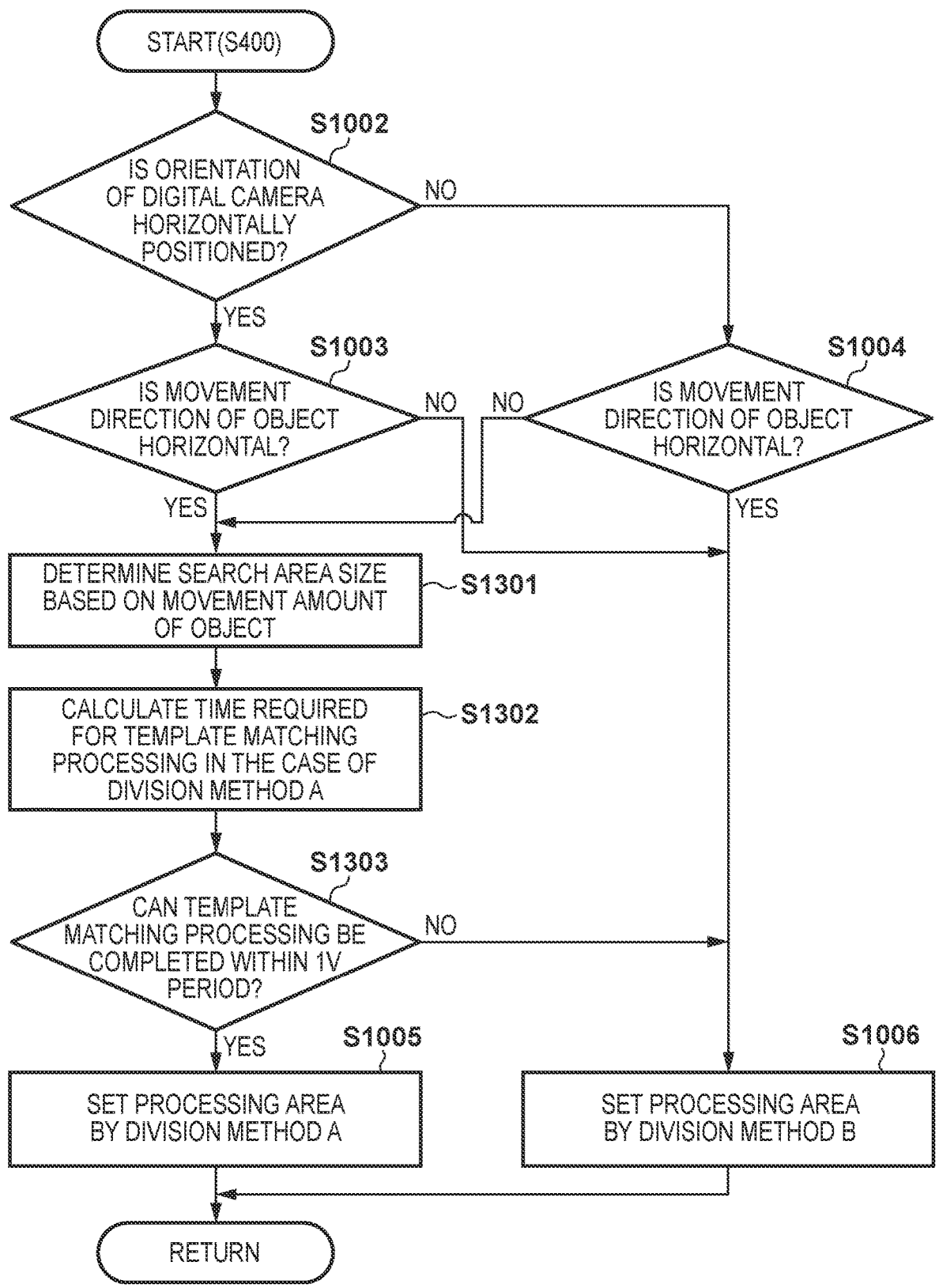
FIG. 13 is a flowchart showing details of division direction determination processing (step S400 of FIG. 4) according to the second embodiment.
Figure 14:
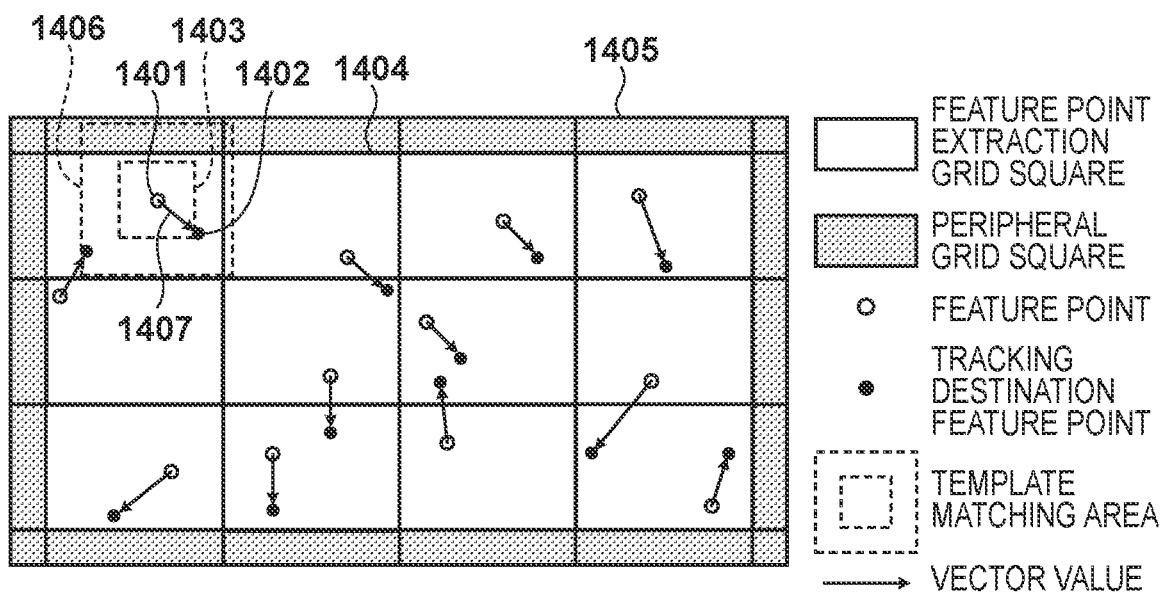
FIG. 14 is a diagram showing an outline of feature point tracking processing.

FIG. 13 is a flowchart showing details of the division direction determination processing (step S400 of FIG. 4) according to the second embodiment.

In step S1301, the CPU 112 recognizes the movement amount of the object based on information from the object detection unit 123, and determines the search area size of template matching processing based on the movement amount of the object. Since the motion vector value increases as the movement amount of the object increases, search area size also increases in order to secure the required search range.

In step S1302, the CPU 112 calculates the time required for template matching processing in the case of division method A (in the case where a plurality of processing areas are arranged in the up-down direction of the image sensor 102). In FIG. 12A, periods 1 to 24 of the template matching processing change according to the search area size. Also, although, in FIG. 12A, periods 1 to 12 are shown as being continuous, in the case where each iteration of the template matching processing is completed before the required template image is generated, a period in which template matching processing is not performed occurs between iterations of the template matching processing. This similarly applies for periods 13 to 24.

In step S1303, the CPU 112 determines whether the template matching processing can be completed within the 1V period (within one frame period of moving image shooting), based on the required time calculated in step S1302. In the case where the template matching processing can be completed within the 1V period, the processing advances to step S1005, and, if this is not the case, the processing advances to step S1006.

According to the second embodiment, as described above, the digital camera 100 determines whether the template matching processing can be completed within the 1V period in division method A. In the case where the template matching processing cannot be completed within the 1V period in division method A, the digital camera 100 selects division method B in which the plurality of processing areas are arranged in the right-left direction of the image sensor 102, regardless of the movement direction of the object. It thereby becomes possible to reduce the possibility of not being able to complete the template matching processing within the 1V period.

Note that, in the case where the search area size is large, there is a possibility of not being able to complete template matching processing within the 1V period even with division method B. In this case, the digital camera 100 completes the template matching processing within the 1V period, by omitting the template matching processing in period 12 and period 24 of FIG. 12B, for example.

Third Embodiment

A third embodiment describes a variation of the feature point supplementation processing (step S704 of FIG. 7) in the tracking destination feature point calculation processing (step S409 of FIG. 4). In the present embodiment, the basic configuration of the digital camera 100 is similar to the first embodiment (see FIGS. 1 and 2). Hereinafter, the differences from the first embodiment will mainly be described.

Figure 16:
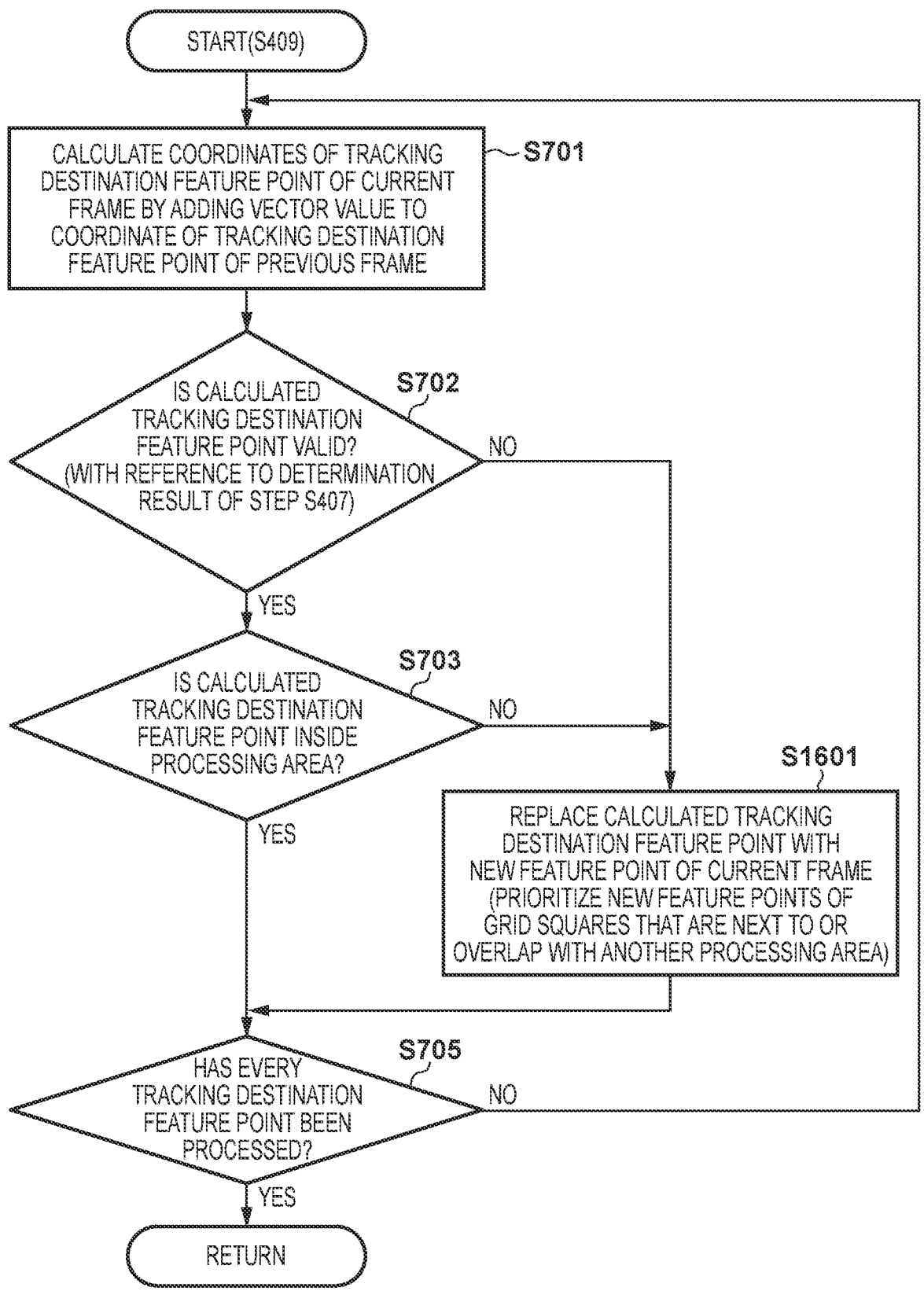
FIG. 16 is a flowchart showing details of tracking destination feature point calculation processing (step S409 of FIG. 4) according to a third embodiment.

FIG. 16 is a flowchart showing tracking destination feature point calculation processing (step S409 of FIG. 4)

according to the third embodiment. In FIG. 16, step S704 is replaced by step S1601, in comparison with the case of the first embodiment (FIG. 7).

In step S1601, the tracking destination feature point determination unit 205 replaces the tracking destination feature point calculated in step S701 with a new feature point of the current frame calculated in step S404 of FIG. 4. That is, if "NO" is determined in step S702 or step S703, the tracking destination feature point determination unit 205 judges that tracking of the feature point failed, and selects a new feature point to be substituted for the tracking destination feature point of the previous frame in the current frame. At this time, the tracking destination feature point determination unit 205 preferentially uses a new feature point calculated in a feature point extraction grid square (supplementation priority grid square) that is next to or at least partially overlaps with another processing area, among the plurality of new feature points calculated in step S404. Also, in the case where there are a plurality of supplementation priority grid squares, the tracking destination feature point determination unit 205 selects the new feature point having the highest feature value Pc, among the new feature points calculated in the plurality of supplementation priority grid squares, as the new feature point to be substituted for the tracking destination feature point of the previous frame in the current frame. It thereby becomes possible to select a new feature point that is highly likely to be highly related to the feature point with respect to which tracking failed, and to improve the detection accuracy of motion vectors.

Figure 17A:
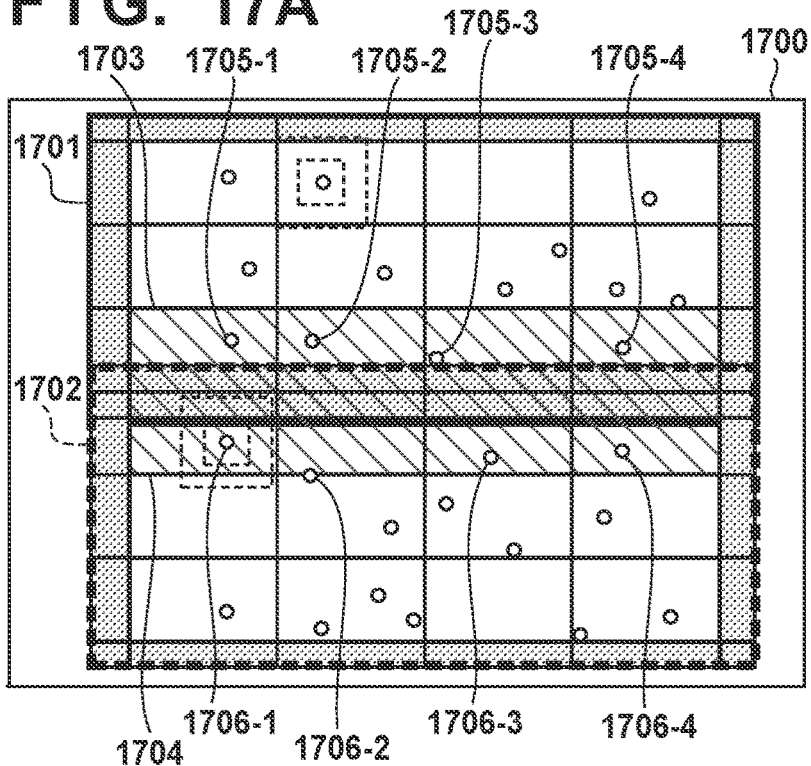
FIGS. 17A and 17B are diagrams illustrating a method of selecting new feature points.

FIG. 17A is a diagram illustrating a method of selecting new feature points in division method A. With respect to an image area 1700, the motion vector detection unit 121 processes a processing area 1701, and the motion vector detection unit 122 processes a processing area 1702. The motion vector detection unit 121 sets a lower end grid square group 1703 that partially overlaps with the processing area 1702, among the feature point extraction grid squares that are included to the processing area 1701, as supplementation priority grid squares. The motion vector detection unit 122 sets an upper end grid square group 1704 that partially overlaps with the processing area 1701, among the feature point extraction grid squares included to the processing area 1702, as supplementation priority grid squares. As a result, new feature points 1705-1 to 1705-4 and 1706-1 to 1706-4 that are calculated in the supplementation priority grid squares are preferentially selected for supplementation in step S1601.

Figure 17B:
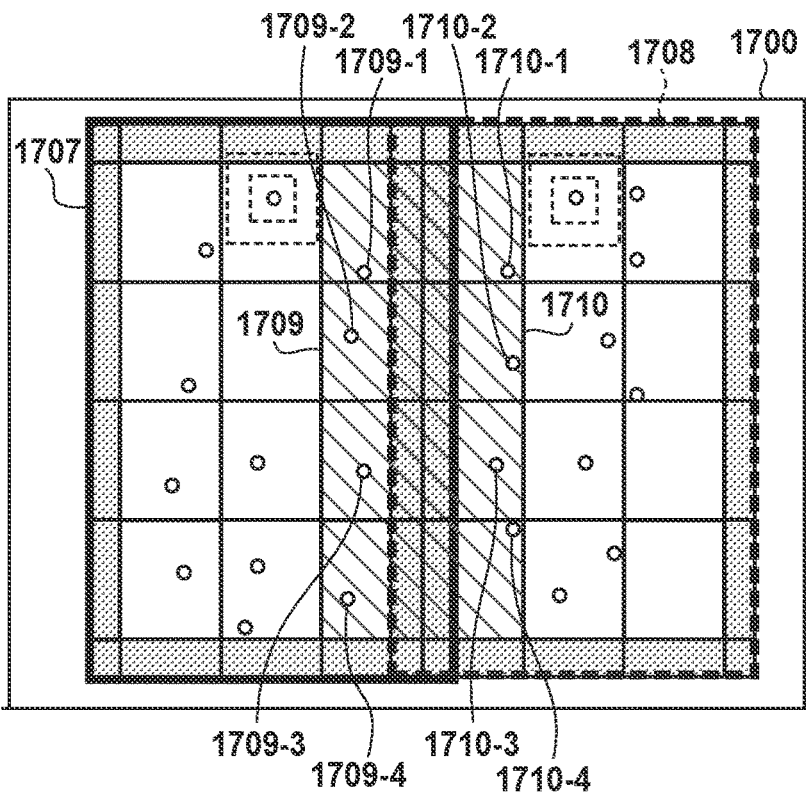

FIG. 17B is a diagram illustrating a method of selecting new feature points in division method B. With respect to the image area 1700, the motion vector detection unit 121 processes a processing area 1707, and the motion vector detection unit 122 processes a processing area 1708. The motion vector detection unit 121 sets a right end grid square group 1709 that partially overlaps with the processing area 1708, among the feature point extraction grid squares included to the processing area 1707, as supplementation priority grid squares. The motion vector detection unit 122 sets a left end grid square group 1710 that partially overlaps with the processing area 1707, among the feature point extraction grid squares included to the processing area 1708, as supplementation priority grid squares. As a result, new feature points 1709-1 to 1709-4 and 1710-1 to 1710-4 calculated in the supplementation priority grid squares are preferentially selected for supplementation in step S1601.

Note that, in the third embodiment, the plurality of processing areas that are set do not necessarily need to be arranged in a different direction from the movement direction of the object.

Figure 18:
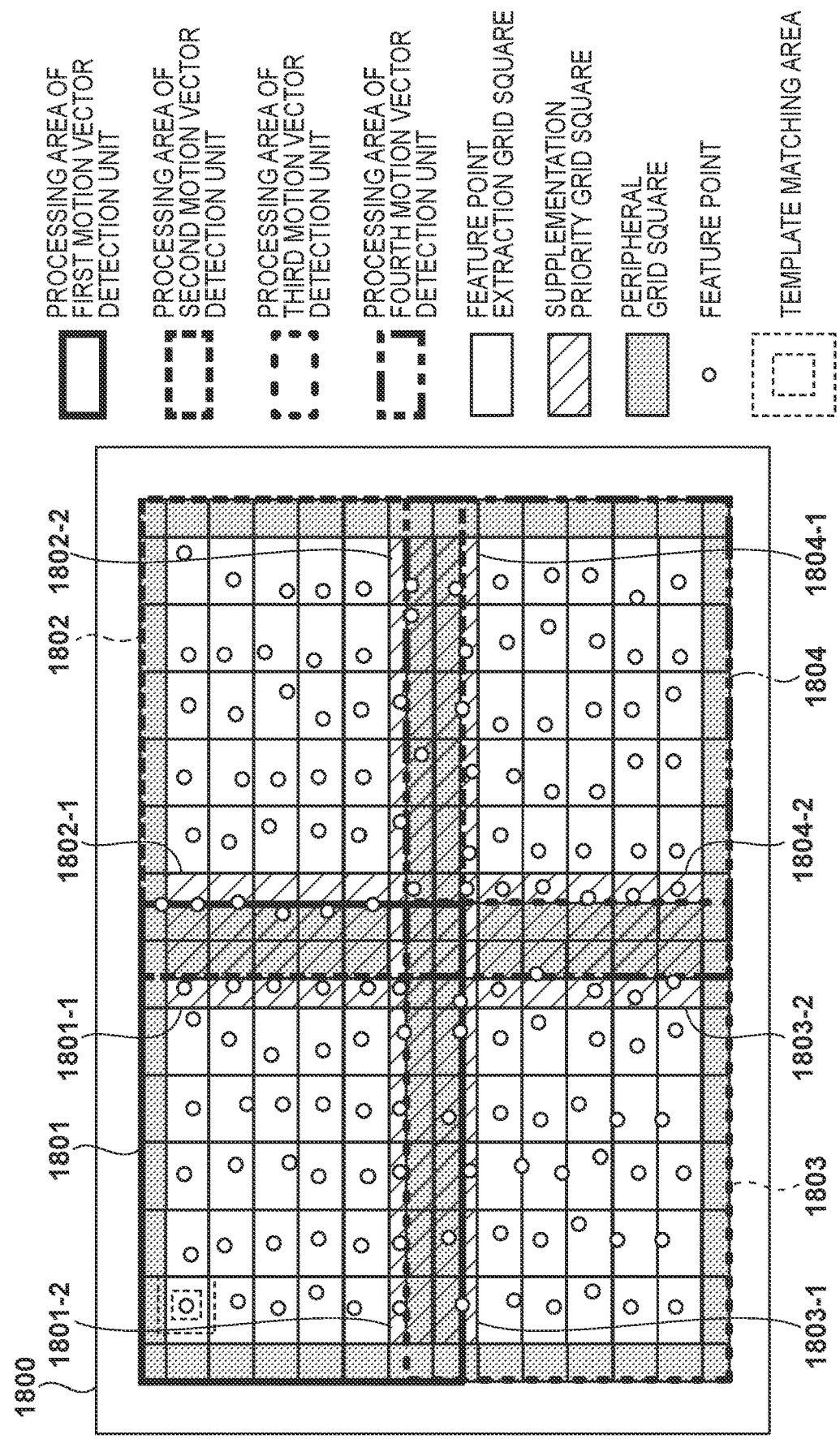
FIG. 18 is a diagram illustrating the case where the digital camera 100 is provided with four motion vector detection units and sets four processing areas.

Also, in the above description, the digital camera 100 is given as being provided with two motion vector detection units. However, the present embodiment is also applicable in the case where the digital camera 100 is provided with three or more motion vector detection units. FIG. 18 is a diagram illustrating the case where the digital camera 100 is provided with four motion vector detection units and four processing areas are set. As shown in FIG. 18, in the case where four processing areas are set, it becomes possible to obtain similar effects, by setting feature point extraction grid squares that partially overlaps with another processing area as supplementation priority grid squares. In the example in FIG. 18, in a processing area 1801 of the first motion vector detection unit, the supplementation priority grid squares are a right end grid square group 1801-1 and a lower end grid square group 1801-2. In a processing area 1802 of the second motion vector detection unit, the supplementation priority grid squares are a left end grid square group 1802-1 and a lower end grid square group 1802-2. In a processing area 1803 of the third motion vector detection unit, the supplementation priority grid squares are an upper end grid square group 1803-1 and a right end grid square group 1803-2. In a processing area 1804 of the fourth motion vector detection unit, the supplementation priority grid squares are an upper end grid square group 1804-1 and a left end grid square group 1804-2.

Figure 19:
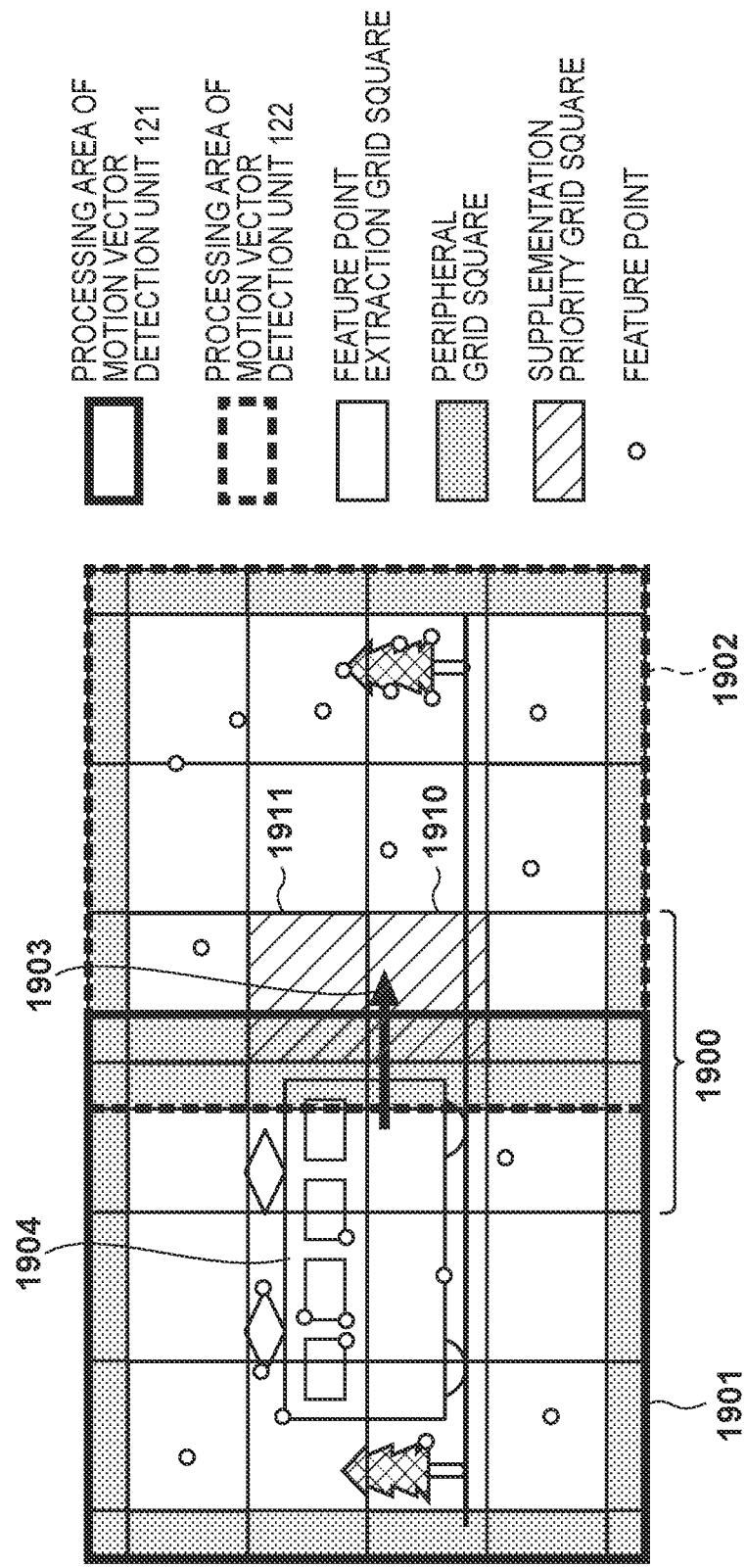
FIG. 19 is a diagram illustrating the case where the digital camera 100 sets supplementation priority grid squares limited to grid squares that an object will enter.

Also, the digital camera 100 may calculate an object area (size) using the object detection unit 123, and set supplementation priority grid squares limited to grid squares that the object will enter, among the feature point extraction grid squares that are next to or at least partially overlap with another processing area. FIG. 19 is a diagram illustrating the case where the digital camera 100 sets supplementation priority grid squares limited to grid squares that the object will enter. In FIG. 19, an object 1904 is moving from a processing area 1901 of the motion vector detection unit 121 toward a processing area 1902 of the motion vector detection unit 122 in the direction of an arrow 1903. The digital camera 100 calculates the object area of the object 1904 using the object detection unit 123. The digital camera 100 then sets a feature point extraction grid square 1910 and a feature point extraction grid square 1911 that the object will enter, out of a feature point extraction grid square group 1900 that is next to or at least partially overlaps with the other processing area, as supplementation priority grid squares. The likelihood of being able to perform tracking without excellent feature points that are detected with the object 1904 being lost at the boundary of the processing area thereby increases, and it becomes possible to improve motion vector detection performance.

Also, in the above description, the digital camera 100 is given as performing motion vector detection on the entire screen. However, the digital camera 100 may perform motion vector detection, limited to the object area detected by the object detection unit 123. FIG. 20A shows the case where the digital camera 100 performs motion vector detection on the entire screen, and, FIG. 20B shows the case where the digital camera 100 performs motion vector detection limited to the object area. In FIG. 20B, feature point extraction grid squares are set in the object area, and areas where the object does not exist are peripheral grid squares. The digital camera 100 sets the supplementation priority grid squares described above, only in the case of the arrangement in FIG. 20B. In the example in FIG. 20B, supplementation priority grid squares 2000 are arranged in the region in which the processing area of the motion vector detection unit 121 and the processing area of the motion vector detection unit 122 partially overlap. In this way, by performing motion vector detection and arrangement of supplementation priority grid squares limited to the object area, the likelihood of being able to perform tracking without excellent feature points that are detected with the object being lost at the boundary of the processing area increases, and it becomes possible to improve motion vector detection performance. On the other hand, in FIG. 20A, motion vector values of the entire screen can be acquired, by supplementing feature points over a wide range, without being limited to the object area. In this way, it is possible to selectively use arrangements of the supplementation priority grid squares, according to the use case.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-062258, filed Mar. 28, 2018, which is hereby incorporated by reference herein in its entirety.

What is claimed is:

1. An image processing apparatus comprising:
at least one processor executing computer executable instructions or at least one circuit which functions as:
a determination unit configured to determine a movement direction of an object;
a setting unit configured to set a plurality of processing areas that are arranged in a different direction from the movement direction detected by the determination unit;
a selection unit configured to select a tracking point in each processing area of a predetermined shot image; and
a plurality of tracking units configured to track, inside each processing area, the tracking point across one or more shot images that are shot after the predetermined shot image, wherein each tracking unit does not track the tracking point in a case where the tracking point moves out of the processing area in which the tracking point was selected.

2. The image processing apparatus according to claim 1, wherein the setting unit sets a plurality of selection areas within each processing area, and
the selection unit selects the tracking point in each selection area of each processing area of the predetermined shot image.

3. The image processing apparatus according to claim 2, wherein, in a case where, in a specific shot image of the one or more shot images, one of the plurality of tracking units fails in tracking of a specific tracking point selected in a specific selection area of the predetermined shot image, the selection unit selects a new tracking point to be substituted for the specific tracking point in the specific selection area of the specific shot image.

4. The image processing apparatus according to claim 2, wherein, in a case where, in a specific shot image of the one or more shot images, one of the plurality of tracking units fails in tracking of a specific tracking point selected in a specific processing area of the predetermined shot image, the selection unit selects a new tracking point to be substituted for the specific tracking point in a specific selection area among the plurality of selection areas of the specific processing area of the specific shot image, and
the specific selection area is one of one or more selection areas that are next to or at least partially overlap with another processing area.

5. The image processing apparatus according to claim 4, wherein in a case where the object is moving in a direction of entering the specific processing area of the specific shot image, the specific selection area is a selection area in a position that the object will enter, among the one or more selection areas that are next to or at least partially overlap with another processing area.

6. The image processing apparatus according to claim 2, wherein the setting unit sets the plurality of selection areas in a position where the object exists within each processing area.

7. The image processing apparatus according to claim 1, wherein the predetermined shot image and the one or more shot images are generated by moving image shooting that uses an image sensor, and
the setting unit:
determines whether tracking of the tracking point by one of the plurality of tracking units in one shot image in a case where the plurality of processing areas are arranged in an up-down direction of the image sensor will be completed within a one frame period of the moving image shooting; and
in a case where tracking of the tracking point will not be completed within the one frame period, sets the plurality of processing areas so as to be arranged in a left-right direction of the image sensor, regardless of the movement direction.

8. An image processing apparatus comprising:
at least one processor executing computer executable instructions or at least one circuit which functions as:
a setting unit configured to set a plurality of processing areas that are arranged in a different direction from a movement direction of an object, and to set a plurality of selection areas within each processing area;
a selection unit configured to select a tracking point in each selection area of each processing area of a predetermined shot image; and
a plurality of tracking units configured to track, inside each processing area, the tracking point across one or more shot images that are shot after the predetermined shot image wherein each tracking unit does not track the tracking point in a case where the tracking point moves out of the processing area in which the tracking point was selected,
wherein, in a case where, in a specific shot image of the one or more shot images, one of the plurality of tracking units fails in tracking of a specific tracking point selected in a specific processing area of the predetermined shot image, the selection unit selects a new tracking point to be substituted for the specific tracking point in a specific selection area among the plurality of selection areas of the specific processing area of the specific shot image, and
the specific selection area is one of one or more selection areas that are next to or at least partially overlap with another processing area.

9. An image capturing apparatus comprising:
the image processing apparatus according to claim 1; and
an image sensor configured to generate the predetermined shot image and the one or more shot images.

10. An image capturing apparatus comprising:
the image processing apparatus according to claim 8; and
an image sensor configured to generate the predetermined shot image and the one or more shot images.

11. An image processing method comprising:
determining a movement direction of an object;
setting a plurality of processing areas that are arranged in a different direction from the movement direction determined in the determining step;
selecting a tracking point in each processing area of a predetermined shot image; and
tracking, inside each processing area, the tracking point across one or more shot images that are shot after the predetermined shot image, wherein the tracking point is not tracked in a case where the tracking point moves out of the processing area in which the tracking point was selected.

12. An image processing method comprising:
setting a plurality of processing areas that are arranged in a different direction from a movement direction of an object, and to set a plurality of selection areas within each processing area;
selecting a tracking point in each selection area of each processing area of a predetermined shot image; and
tracking, inside each processing area, the tracking point across one or more shot images that are shot after the predetermined shot image, wherein the tracking point is not tracked in a case where the tracking point moves out of the processing area in which the tracking point was selected,
wherein, in a case where, in a specific shot image of the one or more shot images, tracking of a specific tracking point selected in a specific processing area of the predetermined shot image fails, selecting a new tracking point to be substituted for the specific tracking point in a specific selection area among the plurality of selection areas of the specific processing area of the specific shot image, and
the specific selection area is one of one or more selection areas that are next to or at least partially overlap with another processing area.

13. A non-transitory computer-readable storage medium which stores a program for causing a computer to execute an image processing method comprising:
determining a movement direction of an object;
setting a plurality of processing areas that are arranged in a different direction from the movement direction determined in the determining step;
selecting a tracking point in each processing area of a predetermined shot image; and
tracking, inside each processing area, the tracking point across one or more shot images that are shot after the predetermined shot image, wherein the tracking point is not tracked in a case where the tracking point moves out of the processing area in which the tracking point was selected.

14. A non-transitory computer-readable storage medium which stores a program for causing a computer to execute an image processing method comprising:
setting a plurality of processing areas that are arranged in a different direction from a movement direction of an object, and to set a plurality of selection areas within each processing area;
selecting a tracking point in each selection area of each processing area of a predetermined shot image; and
tracking, inside each processing area, the tracking point across one or more shot images that are shot after the predetermined shot image, wherein the tracking point is not tracked in a case where the tracking point moves out of the processing area in which the tracking point was selected,
wherein, in a case where, in a specific shot image of the one or more shot images, tracking of a specific tracking point selected in a specific processing area of the predetermined shot image fails, selecting a new tracking point to be substituted for the specific tracking point in a specific selection area among the plurality of selection areas of the specific processing area of the specific shot image, and
the specific selection area is one of one or more selection areas that are next to or at least partially overlap with another processing area.

* * * * *